United States Patent
Moldovean et al.

(10) Patent No.: US 10,621,271 B2
(45) Date of Patent: Apr. 14, 2020

(54) REORDERING A MULTI-LEVEL LAYOUT USING A HIERARCHICAL TREE

(71) Applicant: Microsoft Technology Licensing, LLC, Redmond, WA (US)

(72) Inventors: Marius-Bogdan Moldovean, Seattle, WA (US); Anton Yuriyovych Labunets, Bothell, WA (US); John Giang Nguyen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 15/605,917

(22) Filed: May 25, 2017

(65) Prior Publication Data

US 2018/0341627 A1    Nov. 29, 2018

(51) Int. Cl.
G06F 17/21    (2006.01)
G06F 17/22    (2006.01)
G06F 16/901    (2019.01)

(52) U.S. Cl.
CPC ........ *G06F 17/212* (2013.01); *G06F 16/9027* (2019.01); *G06F 17/218* (2013.01); *G06F 17/2241* (2013.01); *G06F 17/2247* (2013.01)

(58) Field of Classification Search
CPC .. G06F 3/0488; G06F 16/9027; G06F 17/212; G06F 17/218; G06F 17/2241; G06F 17/2247
USPC ........................................................ 715/235
See application file for complete search history.

(56) References Cited

U.S. PATENT DOCUMENTS

| | | | |
|---|---|---|---|
| 7,085,999 B2 | 8/2006 | Maeda et al. | |
| 8,095,865 B2 | 1/2012 | Parikh et al. | |
| 8,181,107 B2 * | 5/2012 | Melnyk | H04L 67/2823 715/238 |
| 8,723,822 B2 | 5/2014 | Williamson et al. | |
| 8,799,325 B2 * | 8/2014 | Callens | G06F 3/0481 707/802 |
| 9,514,105 B2 * | 12/2016 | Callens | G06F 3/0481 |
| 9,563,714 B2 | 2/2017 | Chartier et al. | |
| 10,445,412 B1 * | 10/2019 | Kraus | G06F 17/212 |
| 2002/0111963 A1 | 8/2002 | Gebert et al. | |
| 2004/0205514 A1 * | 10/2004 | Sommerer | G06F 17/212 715/205 |
| 2005/0022115 A1 | 1/2005 | Baumgartner et al. | |
| 2006/0010375 A1 * | 1/2006 | Salesin | G06F 17/212 715/253 |
| 2006/0031755 A1 | 2/2006 | Kashi | |
| 2006/0122996 A1 * | 6/2006 | Bailey | G06F 16/9027 |
| 2007/0245232 A1 | 10/2007 | Wake et al. | |

(Continued)

OTHER PUBLICATIONS

JQuery API, https://api.jquery.com/ (Year: 2015).*

(Continued)

*Primary Examiner* — Maikhanh Nguyen

(74) *Attorney, Agent, or Firm* — Wade IP Law LLC

(57) ABSTRACT

Techniques are described herein that are capable of reordering a multi-level layout using a hierarchical tree. A hierarchical tree is a tree that includes multiple hierarchical levels. Elements of a document may be arranged among the hierarchical levels to provide a logical representation of the document. The elements may be rearranged among the hierarchical levels to cause portions of content that are represented by the elements to be rearranged in a multi-level layout (e.g., a web page).

20 Claims, 7 Drawing Sheets

(56) References Cited

U.S. PATENT DOCUMENTS

| | | |
|---|---|---|
| 2008/0139191 A1 | 6/2008 | Melnyk et al. |
| 2008/0295005 A1* | 11/2008 | Salesin .............. G06F 16/9577 715/763 |
| 2012/0204095 A1 | 8/2012 | Gao et al. |
| 2012/0254733 A1 | 10/2012 | Tucovic |
| 2018/0052808 A1* | 2/2018 | Wan ................... G06F 17/2247 |

OTHER PUBLICATIONS

Nestable , https://dbushell.com/Nestable/ (Year: 2017).*
GitHub repository and Demo & page source, https://github.com/dbushell/Nestable (Year: 2015).*
Zou, et al., "Combining DOM Tree and Geometric Layout Analysis for Online Medical Journal Article Segmentation", Jun. 11, 2006, 10 pages.
"Sortable", https://github.com/RubaXa/Sortable, Published on: Jun. 14, 2007, 20 pages.

\* cited by examiner

REORDERING A MULTI-LEVEL LAYOUT USING A HIERARCHICAL TREE

BACKGROUND

A tree structure may be used to define a logical structure of documents. For example, the tree structure may include objects that represent respective portions of the documents. In accordance with this example, an object may encapsulate (e.g., hide) data to protect the data from direct external manipulation. In one example implementation, an application programming interface (API), such as a document object model (DOM), may be constructed as a tree structure to define a logical structure of an HTML document, an XHTML document, and/or an XML document. A variety of techniques has been proposed for reordering items in documents. However, each such technique has its limitations. For instance, the reordering capabilities of conventional techniques typically are limited to flat lists and/or group lists.

SUMMARY

Various approaches are described herein for, among other things, reordering a multi-level layout using a hierarchical tree. A hierarchical tree is a tree that includes multiple hierarchical levels. Elements of a document may be arranged among the hierarchical levels to provide a logical representation of the document. The elements may be rearranged among the hierarchical levels to cause portions of content that are represented by the elements to be rearranged in a multi-level layout (e.g., a web page).

In a first example approach, a hierarchical tree structure that has hierarchical elements representing respective portions of content of a customizable layout is traversed to identify tagged elements among the hierarchical elements. A hierarchical order tree that includes the tagged elements is created. Each tagged element is capable of being reordered in the hierarchical order tree. At least a specified tagged element from an initial hierarchical logical level of the hierarchical order tree is reordered to a target hierarchical logical level of the hierarchical order tree. The reordering causes the portion of the content that is represented by the specified tagged element to be reordered in the customizable layout.

In a second example approach, a hierarchical tree structure that has hierarchical elements representing respective portions of content of a customizable layout is traversed to identify reorderable elements among the hierarchical elements. Each reorderable element is capable of being reordered in the hierarchical tree structure. Each reorderable element has a respective interface tag indicating a hierarchical interface level of multiple hierarchical interface levels of the custom layout to which the portion of the content that is represented by the respective reorderable element is assigned. A hierarchical order tree that includes a first subset of the reorderable elements and not a second subset of the reorderable elements is created based at least in part on the interface tag of each reorderable element in the first subset not indicating that the portion of the content that is represented by the respective reorderable element is assigned to a designated hierarchical interface level and further based at least in part on the interface tag of each reorderable element in the second subset indicating that the portion of the content that is represented by the respective reorderable element is assigned to the designated hierarchical interface level. At least a specified reorderable element is reordered from an initial location in the hierarchical order tree to a target location in the hierarchical order tree. The reordering causes the portion of the content that is represented by the specified reorderable element to be reordered in the customizable layout.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
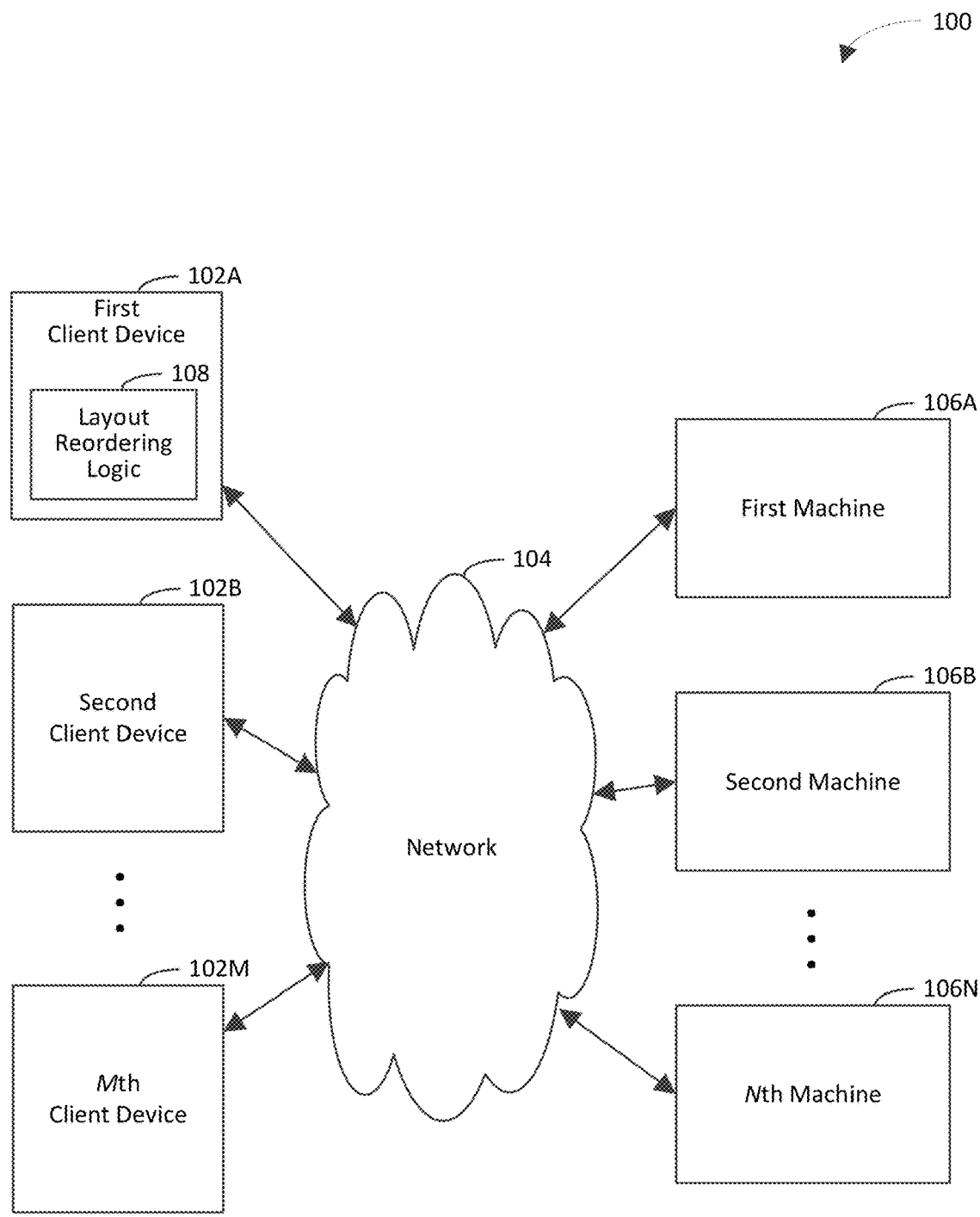
FIG. 1 is a block diagram of an example layout reordering system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of reordering a multi-level layout using a hierarchical tree. A hierarchical tree is a tree that includes multiple hierarchical levels. Elements of a document may be arranged among the hierarchical levels to provide a logical representation of the document. The elements may be rearranged among the hierarchical levels to cause portions of content that are represented by the elements to be rearranged in a multi-level layout (e.g., a web page).

Example techniques described herein have a variety of benefits as compared to conventional techniques for reordering items in documents. For instance, the example techniques may enable reordering of elements in a layout (e.g., a multi-level layout). The example techniques may increase speed and/or operating efficiency of a system that utilizes a hierarchical structure to edit (e.g., reorder) portions of content in a layout. By reordering elements in a subset of the hierarchical structure to cause the portions of the content to be reordered in the layout, the example techniques may reduce an amount of resources (e.g., time, memory, and/or processor cycles) that is consumed to process (e.g., identify, access, and/or reorder) the elements. For instance, a system that performs the reordering may process the elements in the subset without a need to consume the aforementioned resources with regard to elements that are not included in the subset. The example techniques may increase user efficiency. For example, by enabling a user to reorder elements in a subset of the hierarchical structure, the example techniques may reduce a number of steps that are performed by the user, an amount of effort that the user expends, and/or an amount of time that the user takes to cause the portions of the content to be reordered in the layout.

In the following discussion, reference is repeatedly made to "hierarchical structures" and "hierarchical order trees." A hierarchical structure may be used to represent (e.g., model) a document. The hierarchical structure includes hierarchical elements (a.k.a. nodes), which may be implemented as objects. The objects may have respective functions and identities associated with the document. Manipulation of the hierarchical elements in the hierarchical structure may be reflected in a displayed representation of the document. The displayed representation may be configured as a layout having multiple levels in which portions of the content may be arranged.

A hierarchical order tree is a subset of a hierarchical structure. Accordingly, the hierarchical order tree may include fewer than all of the hierarchical elements that are included in the hierarchical structure. It may be desirable to utilize a hierarchical order tree, rather than the entire hierarchical structure, to reorder a multi-level layout for at least the reasons mentioned above.

One type of hierarchical structure is a document object model (DOM). The DOM is an application programming interface (API) that defines a logical structure of documents. The DOM may specify how the documents are represented as objects, so that the documents may be used in object oriented programs, for example. The DOM may define the way the documents are accessed and processed (e.g., programmatically manipulated). For instance, the DOM may identify interfaces and objects that are used to represent and manipulate the documents. The DOM may identify semantics of the interfaces and objects, including behavior and attributes. The DOM may identify logical relationships and collaborations among the interfaces and objects. For instance, the interfaces that are identified by the DOM may define the logical relationships. The DOM may be programming language agnostic, such that the DOM is capable of being used with any programming language. The DOM is mentioned with regard to some embodiments herein for illustrative purposes and is not intended to be limiting. It will be recognized that embodiments described herein with reference to the DOM are applicable to any suitable hierarchical structure. Moreover, such a hierarchical structure may have any of the functionality mentioned above with respect to the DOM.

FIG. 1 is a block diagram of an example layout reordering system 100 in accordance with an embodiment. Generally speaking, layout reordering system 100 operates to provide information to users in response to requests (e.g., hypertext transfer protocol (HTTP) requests) that are received from the users. The information may include documents (e.g., web pages, images, audio files, video files, etc.), output of executables, and/or any other suitable type of information. In accordance with example embodiments described herein, layout reordering system 100 reorders a multi-level layout (e.g., a web page) using a hierarchical tree. Detail regarding techniques for reordering a multi-level layout using a hierarchical tree is provided in the following discussion.

As shown in FIG. 1, layout reordering system 100 includes a plurality of client devices 102A-102M, a network 104, and a plurality of machines 106A-106N. Communication among client devices 102A-102M and machines 106A-106N is carried out over network 104 using well-known network communication protocols. Network 104 may be a wide-area network (e.g., the Internet), a local area network (LAN), another type of network, or a combination thereof.

Client devices 102A-102M are processing systems that are capable of communicating with machines 106A-106N. An example of a processing system is a system that includes at least one processor that is capable of manipulating data in accordance with a set of instructions. For instance, a processing system may be a computer, a personal digital assistant, etc. Client devices 102A-102M are configured to provide requests to machines 106A-106N for requesting information stored on (or otherwise accessible via) machines 106A-106N. For instance, a user may initiate a request for executing a computer program (e.g., an application) using a client (e.g., a Web browser, Web crawler, or other type of client) deployed on a client device 102 that is owned by or otherwise accessible to the user. In accordance with some example embodiments, client devices 102A-102M are capable of accessing domains (e.g., Web sites) hosted by servers 104A-104N, so that client devices 102A-102M may access information that is available via the domains. Such domains may include web pages, which may be provided as hypertext markup language (HTML) documents and objects (e.g., files) that are linked therein, for example.

Client devices 102A-102M may include any client-enabled system or device, including but not limited to a desktop computer, a laptop computer, a tablet computer, a personal digital assistant, a cellular telephone, a wearable device, or the like. It will be recognized that any one or more client devices 102A-102M may communicate with any one or more machines 106A-106N.

First client device 102A is shown to include layout reordering logic 108 for illustrative purposes. Layout reordering logic 108 is configured to reorder a multi-level layout using a hierarchical tree. In a first example implementation, layout reordering logic 108 traverses a hierarchical tree structure that has hierarchical elements representing respective portions of content of a customizable layout to identify tagged elements among the hierarchical elements. In accordance with this implementation, layout reordering logic 108 creates a hierarchical order tree that includes the tagged elements. Each tagged element is capable of being reordered in the hierarchical order tree. In further accordance with this implementation, layout reordering logic 108 reorders at least a specified tagged element from an initial hierarchical logical level of the hierarchical order tree to a target hierarchical logical level of the hierarchical order tree. The reordering causes the portion of the content that is represented by the specified tagged element to be reordered in the customizable layout.

In a second example implementation, layout reordering logic 108 traverses a hierarchical tree structure that has hierarchical elements representing respective portions of content of a customizable layout to identify reorderable elements among the hierarchical elements. Each reorderable element is capable of being reordered in the hierarchical tree structure. Each reorderable element has a respective interface tag indicating a hierarchical interface level of multiple hierarchical interface levels of the custom layout to which the portion of the content that is represented by the respective reorderable element is assigned. In accordance with this implementation, layout reordering logic 108 creates a hierarchical order tree that includes a first subset of the reorderable elements and not a second subset of the reorderable elements based at least in part on the interface tag of each reorderable element in the first subset not indicating that the portion of the content that is represented by the respective reorderable element is assigned to a designated hierarchical interface level and further based at least in part on the interface tag of each reorderable element in the second subset indicating that the portion of the content that is represented by the respective reorderable element is assigned to the designated hierarchical interface level. In further accordance with this implementation, layout reordering logic 108 reorders at least a specified reorderable element from an initial location in the hierarchical order tree to a target location in the hierarchical order tree. The reordering causes the portion of the content that is represented by the specified reorderable element to be reordered in the customizable layout.

Example techniques for reordering a multi-level layout using a hierarchical tree are discussed in greater detail below with reference to FIGS. 2-6.

Machines 106A-106N are processing systems that are capable of communicating with client devices 102A-102M. Machines 106A-106N are configured to execute computer programs that provide information to users in response to receiving requests from the users. For example, the information may include documents (e.g., web pages, images, audio files, video files, etc.), output of executables, or any other suitable type of information. In accordance with some example embodiments, machines 106A-106N are configured to host respective Web sites, so that the Web sites are accessible to users of layout reordering system 100.

Layout reordering logic 108 is shown to be incorporated in device 102A for illustrative purposes and is not intended to be limiting. It will be recognized that at least a portion (e.g., all) of layout reordering logic 108 may be external to first client device 102A. For example, at least a portion of layout reordering logic 108 may be incorporated in any one or more of the machines 106A-106N. In accordance with this example, client-side aspects of layout reordering logic 108 may be incorporated in client device 102A, and server-side aspects of layout reordering logic 108 may be incorporated in one or more of the machines 106A-106N.

Layout reordering logic 108 may be incorporated in a web browser and/or a web platform (e.g., web-based collaborative platform), though the scope of the example embodiments is not limited in this respect. Examples of a web browser include but are not limited to Internet Explorer®, developed and distributed by Microsoft Corporation; Microsoft Edge®, developed and distributed by Microsoft Corporation; Firefox®, developed and distributed by Mozilla Foundation and its subsidiary, Mozilla Corporation; Google Chrome®, developed and distributed by Google Inc., which is a subsidiary of Alphabet Inc.; and Safari®, developed and distributed by Apple Inc. Examples of a web platform include but are not limited to SharePoint®, developed and distributed by Microsoft Corporation, and Oracle WebCenter Portal™, developed and distributed by Oracle Corporation.

Layout reordering logic 108 may be implemented in various ways to reorder a multi-level layout using a hierarchical tree, including being implemented in hardware, software, firmware, or any combination thereof. For example, layout reordering logic 108 may be implemented as computer program code configured to be executed in one or more processors. In another example, layout reordering logic 108 may be implemented as hardware logic/electrical circuitry. For instance, layout reordering logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
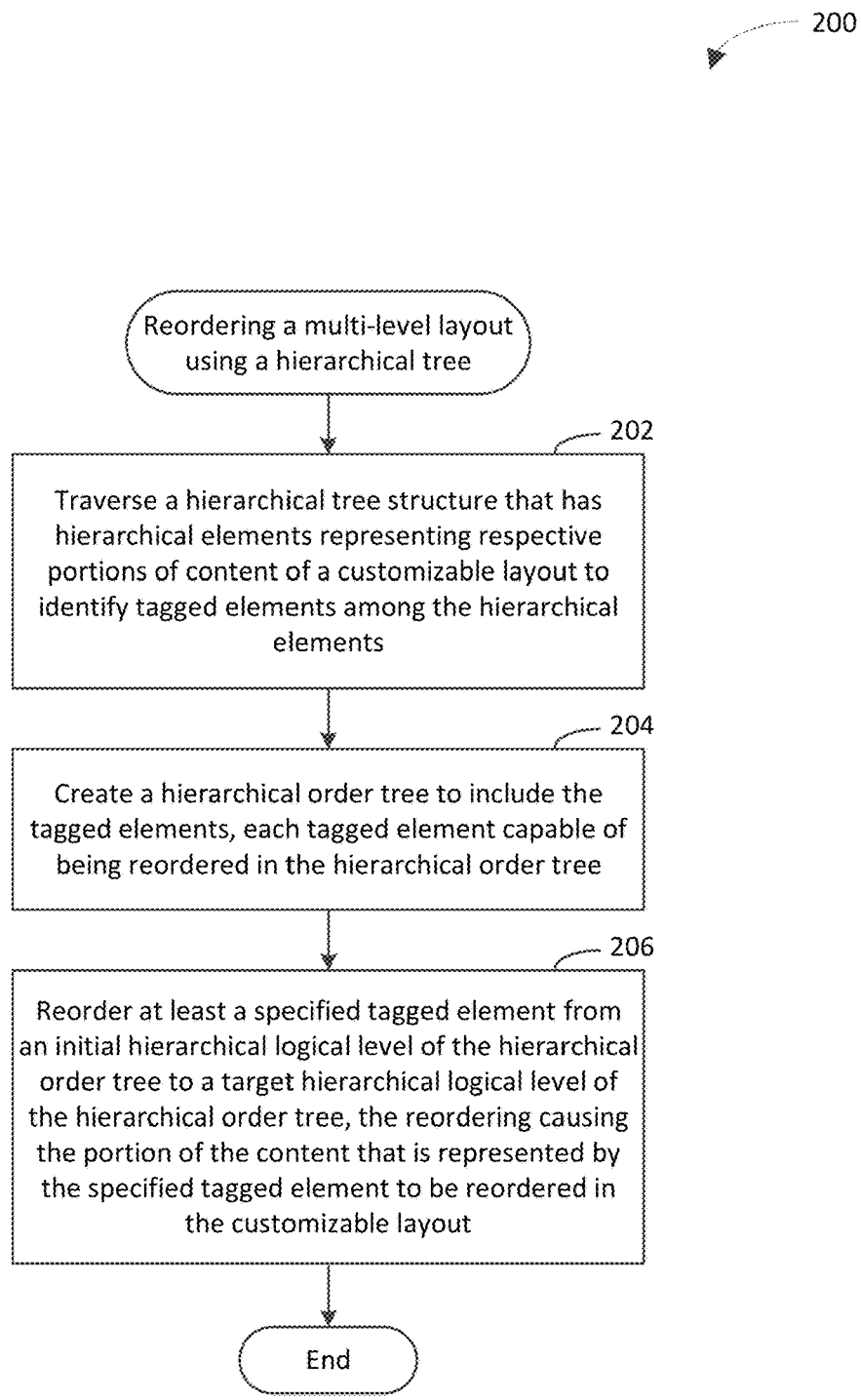
FIGS. 2-3 depict flowcharts of example methods for reordering a multi-level layout using a hierarchical tree in accordance with embodiments.
Figure 3:
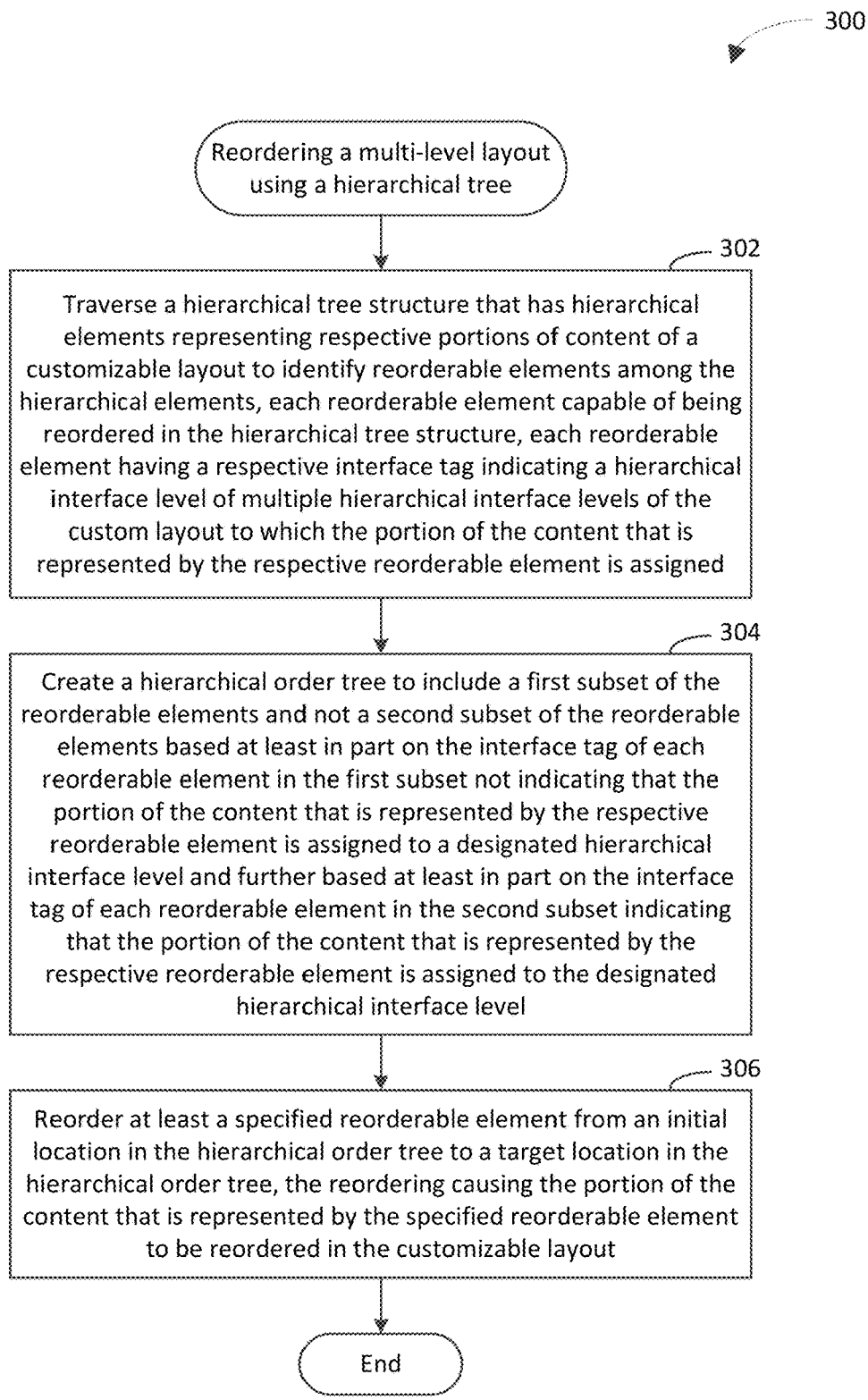
Figure 4:
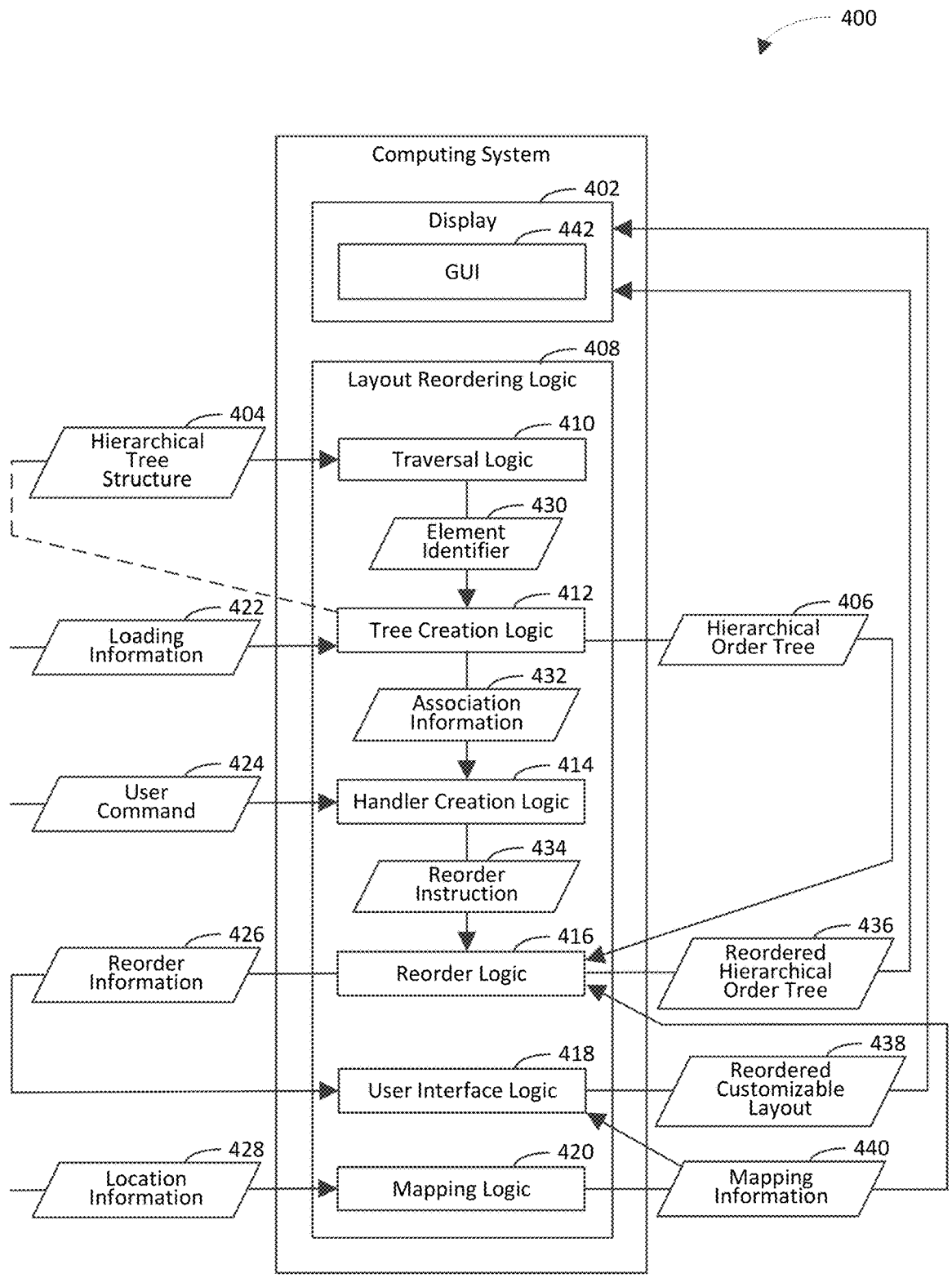
FIG. 4 is a block diagram of an example computing system shown in FIG. 1 in accordance with an embodiment.

FIGS. 2-3 depict flowcharts 200 and 300 of example methods for reordering a multi-level layout using a hierarchical tree in accordance with embodiments. Flowcharts 200 and 300 may be performed by any one or more of client devices 102A-102M and/or any one or more of machines 106A-106N shown in FIG. 1, for example. For illustrative purposes, flowcharts 200 and 300 are described with respect to a computing system 400 shown in FIG. 4. As shown in FIG. 4, computing system 400 includes a display 802 and layout reordering logic 408. Layout reordering logic 408 includes traversal logic 410, tree creation logic 412, handler creation logic 414, reorder logic 416, user interface logic 418, and mapping logic 420. Further structural and operational embodiments will be apparent to persons skilled in the relevant art(s) based on the discussion regarding flowcharts 200 and 300.

As shown in FIG. 2, the method of flowchart 200 begins at step 202. In step 202, a hierarchical tree structure that has hierarchical elements representing (e.g., logically representing) respective portions of content of a customizable layout is traversed to identify tagged elements among the hierarchical elements. Examples of a hierarchical tree structure include but are not limited to a document object model (DOM) tree, an extensible markup language (XML) tree structure, (e.g., for UI building) in Windows Presentation Foundation™, an extensible application markup language (XAML) tree structure, an Android™-based XML and/or hypertext markup language (HTML) tree structure, and an iOS™-based XML and/or HTML tree structure. In an example, the customizable layout may be configured to be displayed via a graphical user interface (GUI), such as GUI 442. In accordance with this example, the customizable layout may be referred to as a customizable user interface (UI) layout. Each tagged element has a reorder tag indicating that the respective tagged element is to be included in a hierarchical order tree, such as hierarchical order tree 406. For instance, each tagged element may indicate that the respective tagged element is capable of being reordered in the hierarchical order tree.

In an example implementation, traversal logic 410 traverses a hierarchical tree structure 404 that has the hierarchical elements representing the respective portions of the content of the customizable layout to identify the tagged elements among the hierarchical elements. In accordance with this implementation, traversal logic 410 may generate an element identifier 430 that specifies which of the hierarchical elements are the tagged elements.

At step 204, the hierarchical order tree is created to include the tagged elements (e.g., and not the other hierarchical elements of the hierarchical tree structure). Each tagged element is capable of being reordered in the hierarchical order tree. It should be noted that the hierarchical order tree is a subset of the hierarchical tree structure (i.e., includes fewer than all of the hierarchical elements from the hierarchical tree structure). Accordingly, the connections between the tagged elements in the hierarchical order tree may serve as shortcuts for navigating up and down the hierarchical tree structure.

In an example implementation, tree creation logic 412 creates the hierarchical order tree 406 to include the tagged elements. For instance, tree creation logic 412 may create the hierarchical order tree 406 based at least in part on receipt of the element identifier 430 (e.g., based at least in part on the element identifier 430 specifying the tagged elements). It will be recognized that tree creation logic 412 may create the hierarchical order tree 406 to exclude the hierarchical elements that are not identified to be tagged elements.

At step 206, at least a specified tagged element is reordered from an initial hierarchical logical level of the hierarchical order tree to a target hierarchical logical level of the hierarchical order tree. The reordering causes the portion of the content that is represented by the specified tagged element to be reordered in the customizable layout.

The hierarchical order tree has multiple hierarchical logical levels, including the initial hierarchical logical level and the target hierarchical logical level. The hierarchical order tree may have any suitable number of hierarchical logical levels. For instance, the hierarchical order tree may have three or more hierarchical logical levels. The target hierarchical logical level is different from the initial hierarchical logical level. In one example, the initial hierarchical logical level and the target hierarchical logical level are adjacent in the hierarchical order tree. In another example, one or more other hierarchical logical levels are between the initial hierarchical logical level and the target hierarchical logical level in the hierarchical order tree.

In an example, the specified tagged element may be moved (e.g., dragged or sorted) from a first location in the initial hierarchical logical level to a second location in the target hierarchical logical level. In accordance with this example, descendants of the specified tagged element that are included in the hierarchical order tree may be moved to other hierarchical logical levels of the hierarchical order tree that are below the target hierarchical logical level to maintain the hierarchical relationship between the specified tagged element and its descendants.

It will be recognized that reordering the specified tagged element in the hierarchical order tree may cause the specified tagged element and its descendants to be reordered accordingly in the hierarchical tree structure, regardless whether those descendants are included in the hierarchical order tree. For instance, although descendants of the specified tagged element that are not identified to be tagged elements are not included in the hierarchical order tree, reordering the specified tagged element in the hierarchical order tree may cause such descendants to be moved to other hierarchical logical levels of the hierarchical tree structure to reflect the maintained hierarchical relationship between the specified tagged element and those descendants.

In an example implementation, reorder logic 416 reorders at least the specified tagged element from an initial hierarchical logical level of the hierarchical order tree 406 to a target hierarchical logical level of the hierarchical order tree 402 to provide a reordered hierarchical order tree 436. In accordance with this implementation, display 402 may display the reordered hierarchical order tree 436 via GUI 442. In further accordance with this implementation, reorder logic 416 may generate reorder information 426 in response to at least the specified tagged element being reordered in the hierarchical order tree 406. For instance, the reorder information 426 may specify the initial hierarchical logical level (and/or a location of the specified tagged element therein) and the target hierarchical logical level (and/or a location of the specified tagged element therein). In further accordance with this implementation, user interface logic 418 reorders the portion of the content that is represented by the specified tagged element in the customizable layout to provide a reordered customizable layout 438. For instance, user interface logic 418 may determine a location at which the portion of the content that is represented by the specified tagged element is to be placed in the reordered customizable layout 438 based at least in part on the target hierarchical level (and/or location therein) specified by the reorder information 426. In further accordance with this implementation, display 402 may display the reordered customizable layout 438 via GUI 442.

In an example embodiment, the number of hierarchical logical levels in the hierarchical order tree may be dynamic. For example, reordering at least the specified tagged element at step 206 may include increasing the number of hierarchical logical levels in the hierarchical order tree by reordering at least the specified tagged element. In accordance with this example, the number of hierarchical logical levels may be increased to accommodate the reordering of at least the specified tagged element.

In another example embodiment, the tagged elements include first tagged elements and second tagged elements. The first tagged elements have respective first reorder tags that share a first common value indicating that the first tagged elements are to be included in a first hierarchical order tree. The second tagged elements have respective second reorder tags that share a second common value indicating that the second tagged elements are to be included in a second hierarchical order tree. The second common value is different from the first common value. In accordance with this embodiment, creating the hierarchical order tree at step 204 includes creating the first hierarchical order tree to include the first tagged elements and creating the second hierarchical order tree to include the second tagged elements. In further accordance with this embodiment, the first tagged elements include the specified tagged element. In further accordance with this embodiment, reordering at least the specified tagged element at step 206 includes moving the specified tagged element from the first hierarchical order tree to the second hierarchical order tree and updating the reorder tag of the specified tagged element to include the second common value.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes creating event handlers for the respective tagged elements. The event handlers are configured to trigger reordering of the respective tagged elements in the hierarchical order tree. The implementation of the event handlers may depend on the customizable layout. For instance, the event handlers may be specific for the respective portions of the content that are represented by the respective tagged elements. In an example implementation, handler creation logic 414 creates the event handlers for triggering the reordering of the respective tagged elements in the hierarchical order tree 406. In accordance with this implementation, handler creation logic 414 may generate a reorder instruction 434 in response to (e.g., based at least in part on) an event handler triggering reordering of the respective tagged element. The reorder instruction 434 may instruct reorder logic 416 to reorder the tagged element in the hierarchical order tree 406.

In an aspect of this embodiment, the tagged elements include first tagged elements and second tagged elements. The first tagged elements have respective first reorder tags that share a first common value indicating that the first tagged elements are to be included in a first hierarchical order tree. The second tagged elements have respective second reorder tags that share a second common value indicating that the second tagged elements are to be included in a second hierarchical order tree. The second common value is different from the first common value. In accordance with this aspect, creating the hierarchical order tree at step 204 includes creating the first hierarchical order tree to include the first tagged elements and creating the second hierarchical order tree to include the second tagged elements. In further accordance with this embodiment, the first hierarchical order tree and the second hierarchical order tree share a common tagged element. In further accordance with this aspect, creating the event handlers includes creating a first event handler associated with the first hierarchical order tree for the common tagged element and creating a second event handler associated with the second hierarchical order tree for the common tagged element. The first event handler is configured to trigger reordering of the common tagged element in the first hierarchical order tree. The second event handler is configured to trigger reordering of the common tagged element in the second hierarchical order tree.

In another aspect of this embodiment, each of the event handlers may be configured to trigger reordering of the respective tagged element in the hierarchical order tree based on any of a variety of user actions. For instance, a user action may be detected as a user command 424, requesting reordering of selected tagged element(s) in the hierarchical order tree (e.g., hierarchical order tree 406). In one example, at least one of the event handlers may be configured to trigger reordering of a respective tagged element in the hierarchical order tree based on detection of a touch gesture. In another example, at least one of the event handlers may be configured to trigger reordering of a respective tagged element in the hierarchical order tree based on detection of a hover gesture. In yet another example, at least one of the event handlers may be configured to trigger reordering of a respective tagged element in the hierarchical order tree based on detection of a mouse input. In still another example, at least one of the event handlers may be configured to trigger reordering of a respective tagged element in the hierarchical order tree based on detection of a keyboard input.

In another example embodiment, the customizable layout includes multiple hierarchical interface levels. For instance, the hierarchical interface levels may define a hierarchy of the customizable layout. In accordance with this embodiment, each portion of the content is identified by a respective interface tag that indicates an order of the respective portion with respect to other portions in each hierarchical interface level in which the respective portion is included. For instance, a portion of content is said to be included in the hierarchical interface level in which the portion resides (a.k.a. the portion's "residence level") and each of the hierarchical levels that are above the portion's residence level in the context of the hierarchy of the customizable layout. In further accordance with this embodiment, the method of flowchart 200 further includes mapping locations of the respective tagged elements in the hierarchical order tree to locations of the respective portions of the content that are represented by the respective tagged elements in the customizable layout based at least in part on the respective interface tags.

In an example implementation, location information 428 specifies the locations of the tagged elements in the hierarchical order tree 406 and/or the reordered hierarchical order tree 436 and the locations of the respective portions of the content that are represented by the respective tagged elements in the customizable layout and/or the reordered customizable layout 438. The locations of the portions of the content may be derived and/or extracted from the respective interface tags. In accordance with this implementation, mapping logic 420 maps the locations of the tagged elements to the locations of the respective portions of the content that are represented by the respective tagged elements to provide mapping information 440 in response to receipt of the location information 428 (e.g., based at least in part on the location information 428 specifying the respective locations). The mapping information 440 specifies cross-references the locations of the tagged elements with the locations of the respective portions of the content that are represented by the respective tagged elements. Accordingly, user interface logic 418 may use the mapping information 440 to generate the reordered customizable layout 438. Reorder logic 416 may use the mapping information 440 to generate the reordered hierarchical order tree 436. By using the mapping information 440, user interface logic 418 and/or reorder logic 416 may maintain the relationship (e.g., logical relationship) between the tagged elements and the portions of the content that are represented by the respective tagged elements.

It should be noted that each portion of the content need not necessarily be identified by a respective interface tag as described above. For example, a link list or a data structure may be used to indicate the order of each portion of the content with respect to other portions in each hierarchical interface level in which the respective portion is included. In accordance with this example, the link list or the data structure may be used in lieu of such interface tags. It will be recognized that the link list or the data structure need not necessarily have through points. For instance, the link list or the data structure may be created using pointers.

It should be further noted that the hierarchical interface levels of the customizable layout are distinguished from the hierarchical logical levels of the hierarchical order tree. For instance, the relative ranking of the hierarchical logical level in which a tagged element resides with reference to other hierarchical logical levels in the hierarchical order tree may not be the same as the relatively ranking of the hierarchical interface level in which the portion of the content that is represented by the tagged element resides with reference to other hierarchical interface levels in the customizable layout. For example, a relative ranking of the hierarchical logical level in which a tagged element resides may be "three" to indicate that the hierarchical logical level is third from the bottom (or third from the top) of the hierarchical order tree, and a relative ranking of the hierarchical interface level in which the portion of the content that is represented by the tagged element resides may be "five" to indicate that the hierarchical interface level is fifth from the bottom (or fifth from the top) of the hierarchy associated with the customizable layout. In another example, a relative ranking of the hierarchical logical level in which a tagged element resides may be "two" to indicate that the hierarchical logical level is second from the bottom (or third from the top) of the hierarchical order tree, and a relative ranking of the hierarchical interface level in which the portion of the content that is represented by the tagged element resides may be "one" to indicate that the hierarchical interface level is the lowest (or highest) hierarchical interface level of the hierarchy associated with the customizable layout. The example hierarchical logical levels and hierarchical interface levels described herein are provided for illustrative purposes and are not intended to be limiting. It will be recognized that a tagged element may reside in any suitable hierarchical logical level, and the portion of the content that is represented by the tagged element may reside in any suitable hierarchical interface level.

In yet another example embodiment, the method of flowchart 200 further includes creating the hierarchical tree structure based at least in part on a web page being loaded. For instance, tree creation logic 412 may create the hierarchical tree structure 404 based at least in part on receipt of loading information 422, which may indicate that the web page has been loaded. In accordance with this embodiment, the hierarchical elements represent respective portions of content of the web page. In further accordance with this embodiment, the reordering causes the portion of the content that is represented by the specified tagged element to be reordered in the web page.

In still another example embodiment, the method of flowchart 200 further includes creating the hierarchical tree structure based at least in part on a rich windows-based application being loaded (e.g., in an iOS™ or Android™ operating system). For instance, tree creation logic 412 may create the hierarchical tree structure 404 based at least in part on receipt of loading information 422, which may indicate that the rich windows-based application has been loaded. In accordance with this embodiment, the hierarchical elements represent respective portions of content of the rich windows-based application. In further accordance with this embodiment, the reordering causes the portion of the content that is represented by the specified tagged element to be reordered in the rich windows-based application.

As shown in FIG. 3, the method of flowchart 300 begins at step 302. In step 302, a hierarchical tree structure that has hierarchical elements representing respective portions of content of a customizable layout is traversed to identify reorderable elements among the hierarchical elements. For instance, the customizable layout may be configured to be displayed via a GUI (e.g., GUI 442). Each reorderable element is capable of being reordered in the hierarchical tree structure. Each reorderable element has a respective interface tag indicating a hierarchical interface level of multiple hierarchical interface levels of the custom layout to which the portion of the content that is represented by the respective reorderable element is assigned. In an example implementation, traversal logic 410 traverses a hierarchical tree structure 404 that has the hierarchical elements representing the respective portions of the content of the customizable layout to identify the reorderable elements among the hierarchical elements. In accordance with this implementation, traversal logic 410 may generate an element identifier 430 that specifies which of the hierarchical elements are the orderable elements.

At step 304, a hierarchical order tree is created to include a first subset of the reorderable elements and not a second subset of the reorderable elements based at least in part on the interface tag of each reorderable element in the first subset not indicating that the portion of the content that is represented by the respective reorderable element is assigned to a designated hierarchical interface level of the multiple hierarchical interface levels and further based at least in part on the interface tag of each reorderable element in the second subset indicating that the portion of the content that is represented by the respective reorderable element is assigned to the designated hierarchical interface level.

In an example implementation, tree creation logic 412 creates a hierarchical order tree 406 to include the first subset of the reorderable elements and not the second subset of the reorderable elements. Tree creation logic 412 may create the hierarchical order tree 406 in response to receipt of the element identifier 430. In an aspect of this implementation, the element identifier 430 may include the interface tags of the reorderable elements. In another aspect of this implementation, the element identifier 430 may be derived and/or extracted from the interface tags. In one example, tree creation logic 412 may create the hierarchical order tree 406 based at least in part on the element identifier 430 indicating which of the reorderable elements are included in the first subset and/or which of the reorderable elements are included in the second subset. In accordance with this example, tree creation logic 412 may create the hierarchical order tree 406 based at least in part on the element identifier 430 specifying that the reorderable elements in the first subset are to be included in the hierarchical order tree and/or that the reorderable elements in the second subset are not to be included in the hierarchical order tree.

At step 306, at least a specified reorderable element is reordered from an initial location in the hierarchical order tree to a target location in the hierarchical order tree. The reordering causes the portion of the content that is represented by the specified reorderable element to be reordered in the customizable layout. In an example implementation, reorder logic 416 reorders at least the specified reorderable element from an initial location in the hierarchical order tree 406 to a target location in the hierarchical order tree 402 to provide a reordered hierarchical order tree 436. In accordance with this implementation, display 402 may display the reordered hierarchical order tree 436 via GUI 442. In further accordance with this implementation, reorder logic 416 may generate reorder information 426 in response to at least the specified reorderable element being reordered in the hierarchical order tree 406. For instance, the reorder information 426 may specify the initial location and the target location. In further accordance with this implementation, user interface logic 418 reorders the portion of the content that is represented by the specified reorderable element in the customizable layout to provide a reordered customizable layout 438. For instance, user interface logic 418 may determine a location at which the portion of the content that is represented by the specified reorderable element is to be placed in the reordered customizable layout 438 based at least in part on the target location specified by the reorder information 426. In further accordance with this implementation, display 402 may display the reordered customizable layout 438 via GUI 442

In an example embodiment, the number of hierarchical logical levels in the hierarchical order tree may be dynamic. For example, reordering at least the specified reorderable element at step 306 may include increasing the number of hierarchical logical levels in the hierarchical order tree by reordering at least the specified reorderable element. In accordance with this example, the number of hierarchical logical levels may be increased to accommodate the reordering of at least the specified reorderable element. The first subset of the reorderable elements is arranged among the hierarchical logical levels.

In another example embodiment, the first subset of the reorderable elements includes a first plurality of reorderable elements and a second plurality of reorderable elements. The first plurality of reorderable elements has a first plurality of respective reorder tags that share a first common value indicating that the first plurality of reorderable elements is to be included in a first hierarchical order tree. The second plurality of reorderable elements has a second plurality of respective reorder tags that share a second common value indicating that the second plurality of reorderable elements is to be included in a second hierarchical order tree. The second common value is different from the first common value. In accordance with this embodiment, creating the hierarchical order tree at step 304 includes creating the first hierarchical order tree to include the first plurality of reorderable elements and creating the second hierarchical order tree to include the second plurality of reorderable elements. In further accordance with this embodiment, the first plurality of reorderable elements includes the specified reorderable element. In further accordance with this embodiment, reordering at least the specified reorderable element at step 306 includes moving the specified reorderable element from the first hierarchical order tree to the second hierarchical order tree and updating the reorder tag of the specified reorderable element to include the second common value.

In some example embodiments, one or more steps 302, 304, and/or 306 of flowchart 300 may not be performed. Moreover, steps in addition to or in lieu of steps 302, 304, and/or 306 may be performed. For instance, in an example embodiment, the method of flowchart 300 further includes creating event handlers for the respective reorderable elements in the first subset. The event handlers are configured to trigger reordering of the respective reorderable elements in the hierarchical order tree. In an example implementation, handler creation logic 414 creates the event handlers for triggering the reordering of the respective reorderable elements in the first subset. In accordance with this implementation, handler creation logic 414 may generate a reorder instruction 434 in response to (e.g., based at least in part on) an event handler triggering reordering of the respective reorderable element. The reorder instruction 434 may instruct reorder logic 416 to reorder the reorderable element in the hierarchical order tree 406.

In an aspect of this embodiment, the first subset of the reorderable elements includes a first plurality of reorderable elements and a second plurality of reorderable elements. The first plurality of reorderable elements has a first plurality of respective reorder tags that share a first common value indicating that the first plurality of reorderable elements is to be included in a first hierarchical order tree. The second plurality of reorderable elements has a second plurality of respective reorder tags that share a second common value indicating that the second plurality of reorderable elements is to be included in a second hierarchical order tree. The second common value is different from the first common value. In accordance with this embodiment, creating the hierarchical order tree at step 304 includes creating the first hierarchical order tree to include the first plurality of reorderable elements and creating the second hierarchical order tree to include the second plurality of reorderable elements. In further accordance with this embodiment, the first hierarchical order tree and the second hierarchical order tree share a common reorderable element. In further accordance with this embodiment, creating the event handlers includes creating a first event handler associated with the first hierarchical order tree for the common reorderable element and creating a second event handler associated with the second hierarchical order tree for the common reorderable element. The first event handler is configured to trigger reordering of the common reorderable element in the first hierarchical order tree. The second event handler is configured to trigger reordering of the common reorderable element in the second hierarchical order tree.

In another aspect of this embodiment, each of the event handlers may be configured to trigger reordering of the respective reorderable element in the hierarchical order tree based on any of a variety of user actions. For example, at least one of the event handlers may be configured to trigger reordering of a respective reorderable element in the hierarchical order tree based on detection of a touch gesture. In another example, at least one of the event handlers may be configured to trigger reordering of a respective reorderable element in the hierarchical order tree based on detection of a hover gesture. In yet another example, at least one of the event handlers may be configured to trigger reordering of a respective reorderable element in the hierarchical order tree based on detection of a mouse input. In still another example, at least one of the event handlers may be configured to trigger reordering of a respective reorderable element in the hierarchical order tree based on detection of a keyboard input.

In another example embodiment, the interface tag of each reorderable element further indicates an order of the portion of the content that is represented by the respective reorderable element with respect to other portions in each hierarchical interface level in which the respective portion is included. In accordance with this embodiment, the method of flowchart 300 further includes mapping locations of the respective reorderable elements in the hierarchical order tree to locations of the respective portions of the content that are represented by the respective reorderable elements in the customizable layout based at least in part on the respective interface tags.

In an example implementation, location information 428 specifies the locations of the reorderable elements in the hierarchical order tree 406 and/or the reordered hierarchical order tree 436 and the locations of the respective portions of the content that are represented by the respective reorderable elements in the customizable layout and/or the reordered customizable layout 438. The locations of the portions of the content may be derived and/or extracted from the respective interface tags. In accordance with this implementation, mapping logic 420 maps the locations of the reorderable elements to the locations of the respective portions of the content that are represented by the respective reorderable elements to provide mapping information 440 in response to receipt of the location information 428 (e.g., based at least in part on the location information 428 specifying the respective locations). The mapping information 440 specifies cross-references the locations of the reorderable elements with the locations of the respective portions of the content that are represented by the respective reorderable elements. Accordingly, user interface logic 418 may use the mapping information 440 to generate the reordered customizable layout 438. Reorder logic 416 may use the mapping information 440 to generate the reordered hierarchical order tree 436. By using the mapping information 440, user interface logic 418 and/or reorder logic 416 may maintain the relationship (e.g., logical relationship) between the reorderable elements and the portions of the content that are represented by the respective reorderable elements.

In yet another example embodiment, the method of flowchart 300 further includes creating the hierarchical tree structure based at least in part on a web page being loaded. For instance, tree creation logic 412 may create the hierarchical tree structure 404 based at least in part on receipt of loading information 422, which may indicate that the web page has been loaded. In accordance with this embodiment, the hierarchical elements represent respective portions of content of the web page. In further accordance with this embodiment, the reordering causes the portion of the content that is represented by the specified reorderable element to be reordered in the web page.

In still another example embodiment, the method of flowchart 300 further includes creating the hierarchical tree structure based at least in part on a rich windows-based application being loaded. For instance, tree creation logic 412 may create the hierarchical tree structure 404 based at least in part on receipt of loading information 422, which may indicate that the rich windows-based application has been loaded. In accordance with this embodiment, the hierarchical elements represent respective portions of content of the rich windows-based application. In further accordance with this embodiment, the reordering causes the portion of the content that is represented by the specified reorderable element to be reordered in the rich windows-based application.

It will be recognized that computing system 400 may not include one or more of display 802, layout reordering logic 408, traversal logic 410, tree creation logic 412, handler creation logic 414, reorder logic 416, user interface logic 418, and/or mapping logic 420. Furthermore, computing system 400 may include components in addition to or in lieu of display 802, layout reordering logic 408, traversal logic 410, tree creation logic 412, handler creation logic 414, reorder logic 416, user interface logic 418, and/or mapping logic 420.

Any one or more of layout reordering logic 408, traversal logic 410, tree creation logic 412, handler creation logic 414, reorder logic 416, user interface logic 418, mapping logic 420, flowchart 200, and/or flowchart 300 may be implemented in hardware, software, firmware, or any combination thereof.

For example, any one or more of layout reordering logic 408, traversal logic 410, tree creation logic 412, handler creation logic 414, reorder logic 416, user interface logic 418, mapping logic 420, flowchart 200, and/or flowchart 300 may be implemented, at least in part, as computer program code configured to be executed in one or more processors.

In another example, any one or more of layout reordering logic 408, traversal logic 410, tree creation logic 412, handler creation logic 414, reorder logic 416, user interface logic 418, mapping logic 420, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 5:
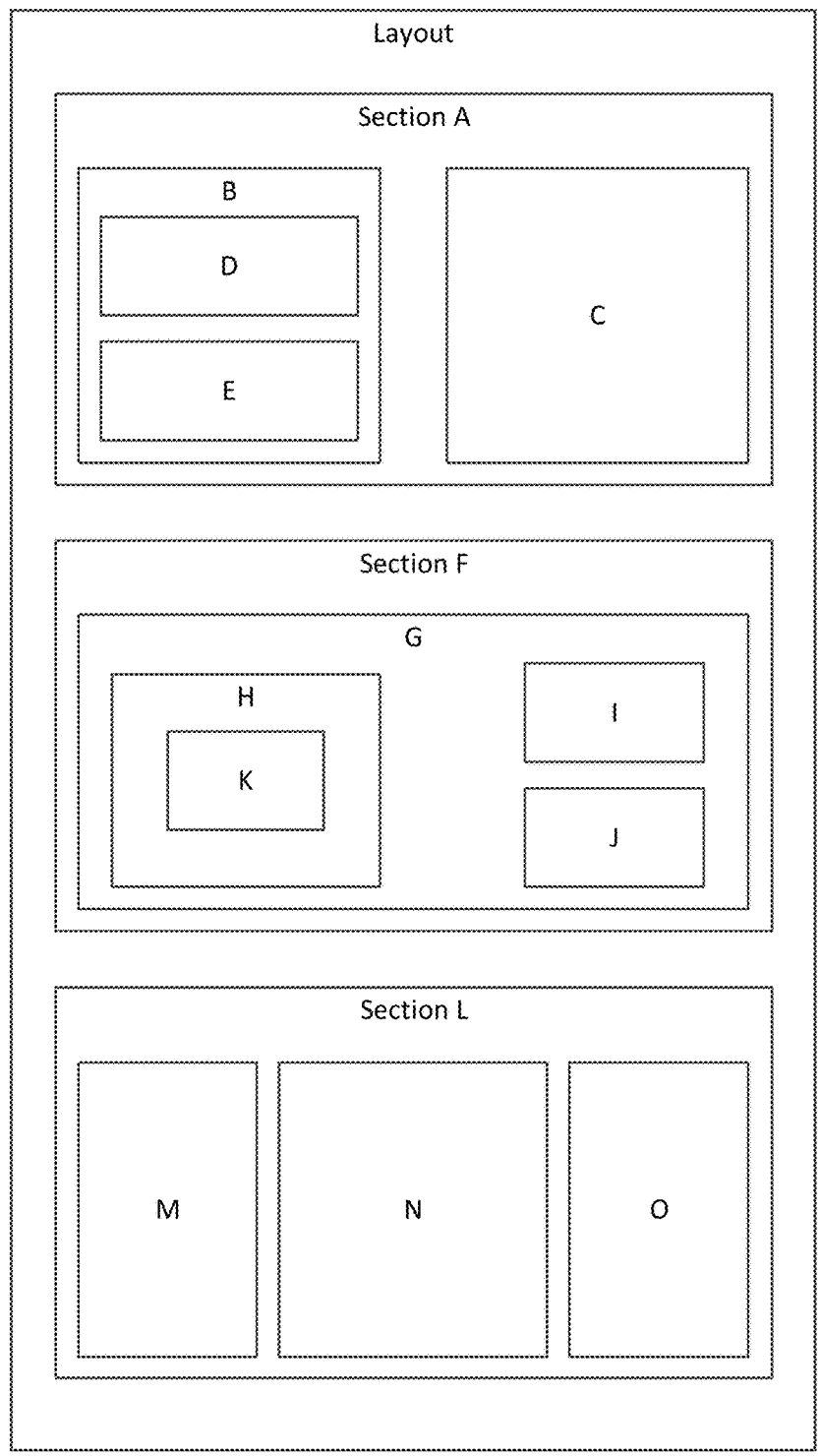
FIG. 5 depicts an example layout in accordance with an embodiment.

FIG. 5 depicts an example layout 500 in accordance with an embodiment. Layout 500 includes components A-O, which are arranged among various levels of a hierarchy. In the example of FIG. 5, the hierarchy includes sections, columns, widgets, and potentially other levels. For instance, components A, F, and L are depicted as sections. In section A, components B and C may be columns. Components D and E may be widgets. In section F, component G may be a column. Components I and J may be widgets. Components H and K may be a widget and another type of component, respectively, or vice versa. In section L, each of components M, N, and O may be a column or a widget.

Any of components A-O may be reorderable in layout 500. For instance, tags may indicate in which level of the hierarchy a component resides, the order of the component with regard to other components in the level where the component resides, and whether an element that represents the component is to be included in a hierarchical reorder tree. A tag may indicate whether an element is to be included in a hierarchical reorder tree by indicating whether the element is reorderable, by indicating whether elements representing components in a designated level of the hierarchy of layout 500 are allowed to be included in a hierarchical reorder tree, etc. A tag may provide other information about an element, such as whether an element is a leaf, a number and/or type of children of the element, etc. Using tags, the techniques described herein may determine a next and/or previous position of an element in a tree (and/or a corresponding position of the component represented by the element in layout 500), a position of a next parent of the element in the tree, etc.

In one example, component A may be moved from a first location [1,0,0] to a second location [0,1,0] in layout 500. In this example, the notation [1,0,0] may indicate that the component is the second control from the first column of the first section. The notation [0,1,0] may indicate that the component is to become the first control in the second column of the first section. The second location may be the next possible position of a leaf for a component in the first location. For instance, component A may be moved to the next possible position when a user presses the up arrow on the keyboard. To further clarify the concept of "next possible position," the next possible position of element [0,0,0] may be [1,0,0]; whereas, the next possible position of element [1,0,0] in the example of FIG. 5 in the next column (i.e., [0,1,0]).

Figure 6:
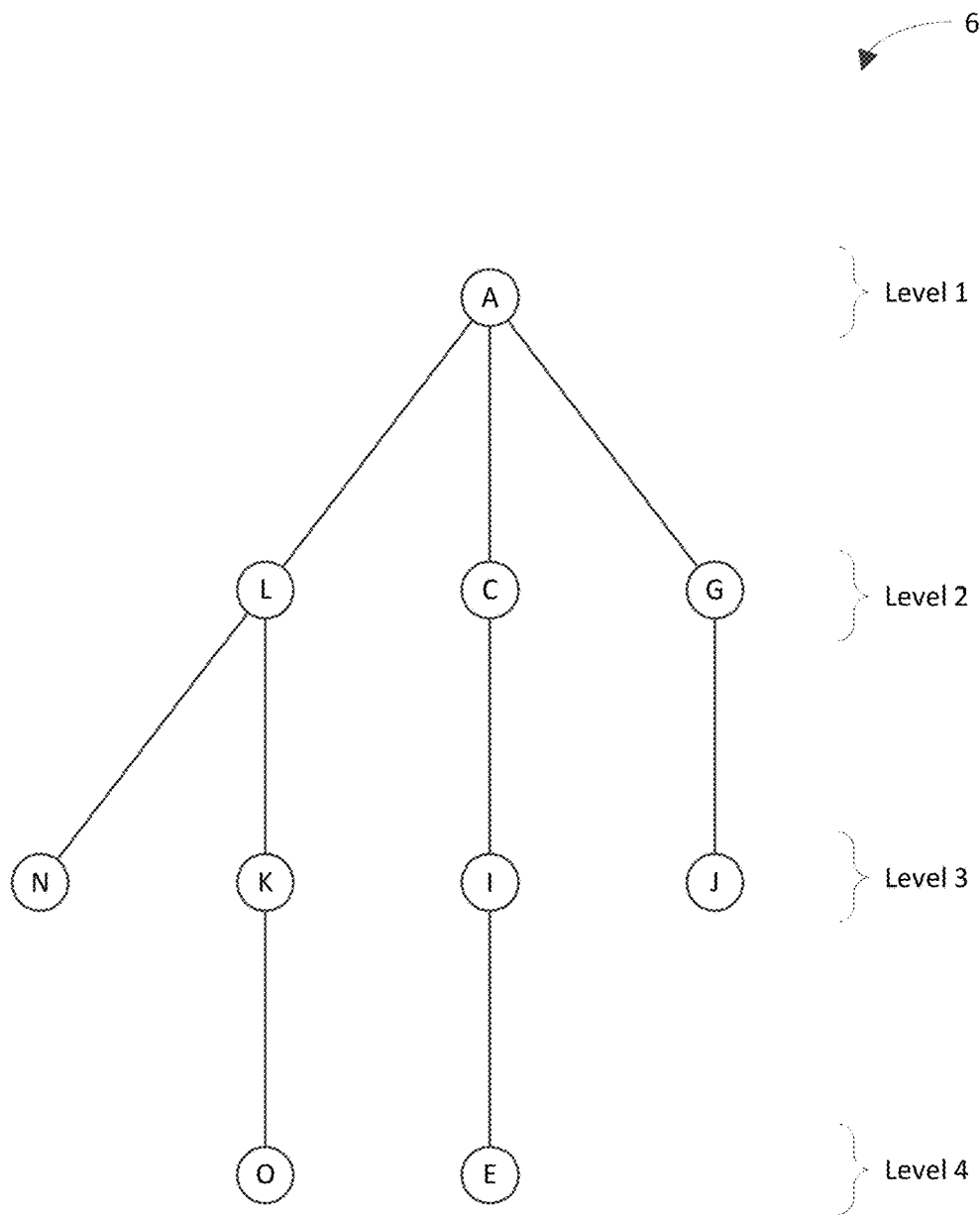
FIG. 6 depicts an example hierarchical reorder tree in accordance with an embodiment.

FIG. 6 depicts an example hierarchical reorder tree 600 in accordance with an embodiment. Hierarchical reorder tree 600 includes hierarchical elements arranged among multiple hierarchical levels of the hierarchical reorder tree 600. The hierarchical levels of the hierarchical reorder tree 600 are labeled "Level 1", "Level 2", "Level 3", and "Level 4". Level 1 includes element A, which represents component A in layout 500. Level 2 includes elements L, C, and G, which represent respective components L, C, and G in layout 500. Level 3 includes elements N, K, I, and J, which represent respective components N, K, I, and J in layout 500. Level 4 includes elements O and E, which represent respective components O and E in layout 500. Hierarchical order tree 600 is a subset of a hierarchical structure (not shown) that represents the entirety of layout 500. Elements from the hierarchical structure are selectively included in hierarchical order tree 600 depending on the tags that are associated with the elements. Some of the components in layout 500 are not represented by elements in hierarchical order tree 600. In particular, components B, D, F, H, and M are not represented in hierarchical order tree 600. Although the hierarchical structure that represents the entirety of layout 500 includes elements B, D, F, H, and M, which represent the corresponding components in layout 500, the elements B, D, F, H, and M do not include the requisite tags to indicate that these elements are to be included in hierarchical reorder tree 600.

It should be noted that the hierarchical arrangement of the components in layout 500 in FIG. 5 need not be the same as the hierarchical arrangement of the corresponding elements in hierarchical order tree 600. For instance, components K, I, and J may not appear to be in a common hierarchical level in layout 500. However, elements K, I, and J, which represent components K, I, and J, are shown to be in a common hierarchical level (Level 3 in this example) of hierarchical order tree 600.

Referring back to the concept of "next possible position," the next possible position for leaf O in hierarchical order tree 600 is before leaf E (as a sibling of E). The next possible position for leaf E is as a child of leaf J. In some example embodiments, if leaf J had not existed, leaf J may be created (e.g., in real time) so that leaf E may become a child of leaf J. It should be noted that "next possible position" is one example concept for reordering an element. Persons skilled in the relevant art will recognize that elements in hierarchical order tree 600 may be moved from any suitable location in hierarchical order tree 600 to any other suitable location in hierarchical order tree 600. For example, an interior node of hierarchical order tree 600 may be reordered to become a child of a leaf node of hierarchical order tree 600. In accordance with this example, if hierarchical order tree 600 does not include a hierarchical level to correspond to the location that is to include the moved interior node (or any other node, for that matter), the example techniques may create a new hierarchical level to be added to hierarchical order tree 600 to accommodate the moved interior node (or other node).

III. Example Code Implementation

A reorder control is a control that is capable of reordering hierarchical elements in a hierarchical order tree. A reorder control may be a wrapper element (e.g., a wrapper DOM element) that traverses its children and manages any item (i.e., hierarchical element) that is marked with specified data attribute(s). The traversed hierarchical structure may have any suitable number of parent/child levels. The reorder control may handle reordering (e.g., moving) marked items in the hierarchical structure (e.g., via a drag and drop operation), for example, using mouse and/or touch browser events. Reordering marked items may be managed through throttling of the layout reordering logic. For instance, the layout reordering logic may not be based on browser events but on emulations of such events that may run at designated time intervals that are configurable. Some example tags, methods, and event handlers are discussed below for illustrative purposes to provide further detail as to how the example embodiments described herein may be implemented in code. By utilizing such tags, methods, and event handlers, the code may provide a platform-dependent technique for moving content around a tree structure, such as the DOM, and keeping track of item positions in the tree structure before and after the move. For instance, attaching tags to the elements of the hierarchical structure that are selected for inclusion in a hierarchical order tree that is a subset of the hierarchical structure may enable the reordering functionality described herein to be reused. The code may be implemented using any suitable language. A wrapper may be used to facilitate use of the code in a desired environment. The following code is depicted as plain JavaScript® code for purposes of illustration and is not intended to be limiting. Moreover, a React wrapper is used to facilitate use of the code in a React environment for illustrative purposes and is not intended to be limiting. React is an open-source JavaScript® library that is commonly used to build user interfaces.

To implement the code, a ReorderZoneControl and a ReorderControl React control may be exposed. A ReorderZoneControl is a control that is usable to move a corresponding portion of the content in the customizable layout from a first position to a second position. A ReorderControl React control is a control that is usable to create the React wrapper.

Following are some example tags that may be incorporated into the code:

"treeLevelTagsBottomUp: string[ ];" identifies the tags at each level of the hierarchy of the customizable layout. The tag associated with each reorderable element to indicate that the reorderable element is to be included in the hierarchical order tree is specified through, in the case of the DOM and this example implementation, a "data-drag-tag" attribute. The "data-drag-tag" attribute for each reorderable element is the same as the value specified in the treeLevelTagsBottomUp for the corresponding level of the hierarchy of the customizable layout. For instance, a first portion of the content in the customizable layout may be designated as the bottom-most portion in the hierarchy. As an example, the array ['control', 'column', 'section'] indicates that the hierarchy of the customizable layout contains sections, which contain columns, which contain controls. 'Control', 'column', and 'section' are referred to as indexes of the array. Each index of the array represents a respective hierarchical level in the hierarchy of the customizable layout. The customizable layout is described as having three hierarchical levels for purposes of illustration and is not intended to be limiting. It will be recognized that the customizable layout may have any suitable number of hierarchical levels. Accordingly, the array may include any suitable number of indexes. A Reorder Zone may be defined for each portion of the content that is to be moved in the customizable layout. A Reorder Zone handles the functionality of moving the portion of content between levels of the hierarchy and within the same level of the hierarchy. In one example, a Reorder Zone may be assigned to each hierarchical level in the hierarchy of the customizable layout.

"isEnabled: boolean;" is a tag that enables and disables the reorder (e.g., drag and drop) functionality. For instance, "isEnabled=false" removes the event handlers from the reorderable elements.

"dragHandleTag?: string;" is a tag that is added to the reorderable elements that are used as reorder (e.g., drag) handles. If unspecified, the whole leaf element becomes reorderable.

"canDropOnEmptyParent?: boolean;" is a tag that is capable of enabling a reorderable element to be dropped from a first position in the customizable layout to a second position in the customizable layout. If not used for sorting, this tag may be set to "true."

"icon?: HTMLElement;" is a tag that identifies the icon that moves with the mouse and/or touch while the reorder operation is being performed.

An event handler, "onMoved: (oldPosition: number[ ], newPosition: number[ ])=>void", is called when a drop operation has been performed. As an example, the positions [0,0,0] and [1,2,3] in the hierarchy indicate that the first control in the first section in the first zone was moved and became the second control in the third section of the fourth zone.

In accordance with the example techniques described herein, the wrapper element may review its children and identify those that are tagged. In one example implementation, the wrapper element adds handlers to the tagged elements for mouseover, mousedown. In accordance with this implementation, if the handle tag is specified, the wrapper element adds the mousedown event to only the reorderable element that has the tag, not to the whole leaf. The example techniques may be capable of differentiating between nodes and leaves. Persons skilled in the relevant art will recognize that the reordering may be performed by a list after callbacks.

Following are some example methods that may be incorporated into the code:

Interaction (ReorderZoneControl):

"_onMouseMove" is added on the window and changes the currentX and currentY.

"_onTouchMove" is added on the window and operates similarly to mouseMove, but on a touch event, rather than a mouse event.

"_onMouseUp" is added on the window. If this method is performed after a drag event, the method resets the state of the control and triggers the onMoved handler.

Lifecycle (ReorderZoneControl):

"_onMouseDown" is added on either the handle or the whole leaf. This method sets a timeout until drag start. This method also sets the starting position of the mouse.

"_onDragStart" removes any selection, makes the document non-selectable, adds event handlers that are on the window, and sets the dragged item position.

"_reset( )" resets the state of the control and removes intervals and window listeners.

"_emulateDragOver" is performed on an interval so that it can be throttled. This method calculates the current position of the line and where the element would be dropped if the drop happened immediately.

"_emulateMouseMove" is performed on an interval. This method calculates the position of the icon.

Helpers (ReorderZoneUtilities, ReorderZoneTree):

"_getElementsWithAttribute" looks at all the hierarchical elements with a data-* tag within a parent and returns those hierarchical elements.

"_shouldInsertBeforeElement" looks at the position of the hierarchical element relative to the coordinates that are received and decides whether the coordinates are in the top half or bottom half of the element. This method is described as working vertically for illustrative purposes and is not intended to be limiting.

"_getHoverOverItemPosition" gets the position as an array of indexes of the item that the mouse cursor is currently over.

"_getDraggedItemPosition" gets the position as an array of indexes of the item that is currently being dragged.

"_getLeafElementFromMousePosition" gets the position of the leaf element that the mouse currently hovers over, if any.

"_getBottomMostElementFromMousePosition" gets the position of the bottom-most element in the tree hierarchy that the mouse is currently hovering over.

"_getElementPosition" gets the position of a designated item within the hierarchy as an array of indexes.

"_getElementTagLevel" gets the level of the current element in the hierarchy.

The handlers may use the following notation:

"onItemMoved(oldPosition: number[ ], newPosition: number[ ])"

The example, controls, tags, methods, and handlers described above are provided for illustrative purposes and are not intended to be limiting. It will be recognized that any suitable controls, tags, methods, and handlers may be utilized to implement the example techniques described herein.

IV. Further Discussion of Some Example Embodiments

In a first example method of controlling a customizable layout using at least one of (a) one or more processors, (b) hardware logic, or (c) electrical circuitry, a hierarchical tree structure that has hierarchical elements representing respective portions of content of a customizable layout that is to be displayed via a graphical user interface is traversed to identify tagged elements among the hierarchical elements. Each tagged element has a reorder tag indicating that the respective tagged element is to be included in a hierarchical order tree. The hierarchical order tree is created to include the tagged elements. Each tagged element is capable of being reordered in the hierarchical order tree. At least a specified tagged element is reordered from an initial hierarchical logical level of a plurality of hierarchical logical levels of the hierarchical order tree to a target hierarchical logical level of the plurality of hierarchical logical levels that is different from the initial hierarchical logical level. The reordering causes the portion of the content that is represented by the specified tagged element to be reordered in the customizable layout.

In a first aspect of the first example method, the tagged elements include first tagged elements and second tagged elements. The first tagged elements have respective first reorder tags that share a first common value indicating that the first tagged elements are to be included in a first hierarchical order tree. The second tagged elements have respective second reorder tags that share a second common value indicating that the second tagged elements are to be included in a second hierarchical order tree. The second common value is different from the first common value. In accordance with the first aspect, creating the hierarchical order tree comprises creating the first hierarchical order tree to include the first tagged elements. In further accordance with the first aspect, creating the hierarchical order tree further comprises creating the second hierarchical order tree to include the second tagged elements. In further accordance with the first aspect, the first tagged elements include the specified tagged element. In further accordance with the first aspect, reordering at least the specified tagged element comprises moving the specified tagged element from the first hierarchical order tree to the second hierarchical order tree. In further accordance with the first aspect, reordering at least the specified tagged element further comprises updating the reorder tag of the specified tagged element to include the second common value.

In a second aspect of the first example method, the first example method further comprises creating event handlers for the respective tagged elements, the event handlers configured to trigger reordering of the respective tagged elements in the hierarchical order tree. The second aspect of the first example method may be implemented in combination with the first aspect of the first example method, though the example embodiments are not limited in this respect.

In a first example of the second aspect, the tagged elements include first tagged elements and second tagged elements. The first tagged elements have respective first reorder tags that share a first common value indicating that the first tagged elements are to be included in a first hierarchical order tree. The second tagged elements have respective second reorder tags that share a second common value indicating that the second tagged elements are to be included in a second hierarchical order tree. The second common value is different from the first common value. In accordance with this example, creating the hierarchical order tree comprises creating the first hierarchical order tree to include the first tagged elements. In further accordance with this example, creating the hierarchical order tree further comprises creating the second hierarchical order tree to include the second tagged elements. In further accordance with this example, the first hierarchical order tree and the second hierarchical order tree share a common tagged element. In further accordance with this example, creating the event handlers comprises creating a first event handler associated with the first hierarchical order tree for the common tagged element. The first event handler is configured to trigger reordering of the common tagged element in the first hierarchical order tree. In further accordance with this example, creating the event handlers further comprises creating a second event handler associated with the second hierarchical order tree for the common tagged element. The second event handler is configured to trigger reordering of the common tagged element in the second hierarchical order tree.

In a second example of the second aspect, at least one of the event handlers is configured to trigger reordering of a respective tagged element in the hierarchical order tree based on detection of a touch gesture.

In a third example of the second aspect, at least one of the event handlers is configured to trigger reordering of a respective tagged element in the hierarchical order tree based on detection of a hover gesture.

In a fourth example of the second aspect, at least one of the event handlers is configured to trigger reordering of a respective tagged element in the hierarchical order tree based on detection of a mouse input.

In a fifth example of the second aspect, at least one of the event handlers is configured to trigger reordering of a respective tagged element in the hierarchical order tree based on detection of a keyboard input.

In a third aspect of the first example method, reordering at least the specified tagged element comprises increasing a number of hierarchical logical levels in the plurality of hierarchical logical levels by reordering at least the specified tagged element. The third aspect of the first example method may be implemented in combination with the first and/or second aspect of the first example method, though the example embodiments are not limited in this respect.

In a fourth aspect of the first example method, customizable layout includes a plurality of hierarchical interface levels. In accordance with the fourth aspect, each portion of the content is identified by a respective interface tag that indicates an order of the respective portion with respect to other portions in each hierarchical interface level in which the respective portion is included. In further accordance with the fourth aspect, the first example method further comprises mapping locations of the respective tagged elements in the hierarchical order tree to locations of the respective portions of the content that are represented by the respective tagged elements in the customizable layout based at least in part on the respective interface tags. The fourth aspect of the first example method may be implemented in combination with the first, second, and/or third aspect of the first example method, though the example embodiments are not limited in this respect.

In fifth aspect of the first example method, the first example method further comprises creating the hierarchical tree structure based at least in part on a web page being loaded. In accordance with the fifth aspect, the hierarchical elements represent respective portions of content of the web page. In further accordance with the fifth aspect, the reordering causes the portion of the content that is represented by the specified tagged element to be reordered in the web page. The fifth aspect of the first example method may be implemented in combination with the first, second, third, and/or fourth aspect of the first example method, though the example embodiments are not limited in this respect.

In a second example method of controlling a customizable layout using at least one of (a) one or more processors, (b) hardware logic, or (c) electrical circuitry, a hierarchical tree structure that has hierarchical elements representing respective portions of content of a customizable layout that is to be displayed via a graphical user interface is traversed to identify reorderable elements among the hierarchical elements. Each reorderable element is capable of being reordered in the hierarchical tree structure. Each reorderable element has a respective interface tag indicating a hierarchical interface level of a plurality of hierarchical interface levels of the custom layout to which the portion of the content that is represented by the respective reorderable element is assigned. A hierarchical order tree is created to include a first subset of the reorderable elements and not a second subset of the reorderable elements based at least in part on the interface tag of each reorderable element in the first subset not indicating that the portion of the content that is represented by the respective reorderable element is assigned to a designated hierarchical interface level of the plurality of hierarchical interface levels and further based at least in part on the interface tag of each reorderable element in the second subset indicating that the portion of the content that is represented by the respective reorderable element is assigned to the designated hierarchical interface level. At least a specified reorderable element is reordered from an initial location in the hierarchical order tree to a target location in the hierarchical order tree. The reordering causes the portion of the content that is represented by the specified reorderable element to be reordered in the customizable layout.

In a first aspect of the second example method, the first subset of the reorderable elements includes a first plurality of reorderable elements and a second plurality of reorderable elements. The first plurality of reorderable elements has a first plurality of respective reorder tags that share a first common value indicating that the first plurality of reorderable elements is to be included in a first hierarchical order tree. The second plurality of reorderable elements has a second plurality of respective reorder tags that share a second common value indicating that the second plurality of reorderable elements is to be included in a second hierarchical order tree. The second common value is different from the first common value. In accordance with the first aspect, creating the hierarchical order tree comprises creating the first hierarchical order tree to include the first plurality of reorderable elements. In further accordance with the first aspect, creating the hierarchical order tree further comprises creating the second hierarchical order tree to include the second plurality of reorderable elements. In further accordance with the first aspect, the first plurality of reorderable elements includes the specified reorderable element. In further accordance with the first aspect, reordering at least the specified reorderable element comprises moving the specified reorderable element from the first hierarchical order tree to the second hierarchical order tree. In further accordance with the first aspect, reordering at least the specified reorderable element further comprises updating the reorder tag of the specified reorderable element to include the second common value.

In a second aspect of the second example method, the second example method further comprises creating event handlers for the respective reorderable elements in the first subset, the event handlers configured to trigger reordering of the respective reorderable elements in the hierarchical order tree. The second aspect of the second example method may be implemented in combination with the first aspect of the second example method, though the example embodiments are not limited in this respect.

In a first example of the second aspect, the first subset of the reorderable elements includes a first plurality of reorderable elements and a second plurality of reorderable elements. The first plurality of reorderable elements has a first plurality of respective reorder tags that share a first common value indicating that the first plurality of reorderable elements is to be included in a first hierarchical order tree. The second plurality of reorderable elements has a second plurality of respective reorder tags that share a second common value indicating that the second plurality of reorderable elements is to be included in a second hierarchical order tree. The second common value is different from the first common value. In further accordance with this example, creating the hierarchical order tree comprises creating the first hierarchical order tree to include the first plurality of reorderable elements. In further accordance with this example, creating the hierarchical order tree further comprises creating the second hierarchical order tree to include the second plurality of reorderable elements. In further accordance with this example, the first hierarchical order tree and the second hierarchical order tree share a common reorderable element. In further accordance with this example, creating the event handlers comprises creating a first event handler associated with the first hierarchical order tree for the common reorderable element. The first event handler is configured to trigger reordering of the common reorderable element in the first hierarchical order tree. In further accordance with this example, creating the event handlers further comprises creating a second event handler associated with the second hierarchical order tree for the common reorderable element. The second event handler is configured to trigger reordering of the common reorderable element in the second hierarchical order tree.

In a second example of the second aspect, at least one of the event handlers is configured to trigger reordering of a respective reorderable element in the hierarchical order tree based on detection of a touch gesture.

In a third example of the second aspect, at least one of the event handlers is configured to trigger reordering of a respective reorderable element in the hierarchical order tree based on detection of a hover gesture.

In a fourth example of the second aspect, at least one of the event handlers is configured to trigger reordering of a respective reorderable element in the hierarchical order tree based on detection of a mouse input.

In a fifth example of the second aspect, at least one of the event handlers is configured to trigger reordering of a respective reorderable element in the hierarchical order tree based on detection of a keyboard input.

In a third aspect of the second example method, reordering at least the specified reorderable element comprises increasing a number of hierarchical logical levels in a plurality of hierarchical logical levels among which the first subset of the reorderable elements is arranged in the hierarchical order tree by reordering at least the specified reorderable element. The third aspect of the second example method may be implemented in combination with the first and/or second aspect of the second example method, though the example embodiments are not limited in this respect.

In a fourth aspect of the second example method, the interface tag of each reorderable element further indicates an order of the portion of the content that is represented by the respective reorderable element with respect to other portions in each hierarchical interface level in which the respective portion is included. In accordance with the fourth aspect, the second example method further comprises mapping locations of the respective reorderable elements in the hierarchical order tree to locations of the respective portions of the content that are represented by the respective reorderable elements in the customizable layout based at least in part on the respective interface tags. The fourth aspect of the second example method may be implemented in combination with the first, second, and/or third aspect of the second example method, though the example embodiments are not limited in this respect.

In fifth aspect of the second example method, the second example method further comprises creating the hierarchical tree structure based at least in part on a web page being loaded. In accordance with the fifth aspect, the hierarchical elements represent respective portions of content of the web page. In further accordance with the fifth aspect, the reordering causes the portion of the content that is represented by the specified reorderable element to be reordered in the web page. The fifth aspect of the second example method may be implemented in combination with the first, second, third, and/or fourth aspect of the second example method, though the example embodiments are not limited in this respect.

A first example system to control a customizable layout comprises a system element comprising at least one of (a) one or more processors, (b) hardware logic, or (c) electrical circuitry. Traversal logic is configured to traverse a hierarchical tree structure that has hierarchical elements representing respective portions of content of a customizable layout that is to be displayed via a graphical user interface to identify tagged elements among the hierarchical elements. Each tagged element has a reorder tag indicating that the respective tagged element is to be included in a hierarchical order tree. Tree creation logic is configured to create the hierarchical order tree to include the tagged elements. Each tagged element is capable of being reordered in the hierarchical order tree. Reorder logic, implemented using the system element, is configured to reorder at least a specified tagged element from an initial hierarchical logical level of a plurality of hierarchical logical levels of the hierarchical order tree to a target hierarchical logical level of the plurality of hierarchical logical levels that is different from the initial hierarchical logical level to cause the portion of the content that is represented by the specified tagged element to be reordered in the customizable layout.

In a first aspect of the first example system, the tagged elements include first tagged elements and second tagged elements. The first tagged elements have respective first reorder tags that share a first common value indicating that the first tagged elements are to be included in a first hierarchical order tree. The second tagged elements have respective second reorder tags that share a second common value indicating that the second tagged elements are to be included in a second hierarchical order tree. The second common value is different from the first common value. In accordance with the first aspect, the tree creation logic is configured to create the hierarchical order tree by creating the first hierarchical order tree to include the first tagged elements and by creating the second hierarchical order tree to include the second tagged elements. In further accordance with the first aspect, the first tagged elements include the specified tagged element. In further accordance with the first aspect, the reorder logic is configured to move the specified tagged element from the first hierarchical order tree to the second hierarchical order tree. In further accordance with the first aspect, the reorder logic is configured to update the reorder tag of the specified tagged element to include the second common value.

In a second aspect of the first example system, the first example system further comprises handler creation logic configured to create event handlers for the respective tagged elements. In accordance with the second aspect, the event handlers are configured to trigger reordering of the respective tagged elements in the hierarchical order tree. The second aspect of the first example system may be implemented in combination with the first aspect of the first example system, though the example embodiments are not limited in this respect.

In a first example of the second aspect, the tagged elements include first tagged elements and second tagged elements. The first tagged elements have respective first reorder tags that share a first common value indicating that the first tagged elements are to be included in a first hierarchical order tree. The second tagged elements have respective second reorder tags that share a second common value indicating that the second tagged elements are to be included in a second hierarchical order tree. The second common value is different from the first common value. In accordance with this example, the tree creation logic is configured to create the hierarchical order tree by creating the first hierarchical order tree to include the first tagged elements and by creating the second hierarchical order tree to include the second tagged elements. In further accordance with this example, the first hierarchical order tree and the second hierarchical order tree share a common tagged element. In further accordance with this example, the handler creation logic is configured to create a first event handler associated with the first hierarchical order tree for the common tagged element. The first event handler is configured to trigger reordering of the common tagged element in the first hierarchical order tree. In further accordance with this example, the handler creation logic is configured to create a second event handler associated with the second hierarchical order tree for the common tagged element. The second event handler is configured to trigger reordering of the common tagged element in the second hierarchical order tree.

In a second example of the second aspect, at least one of the event handlers is configured to trigger reordering of a respective tagged element in the hierarchical order tree based on detection of a touch gesture.

In a third example of the second aspect, at least one of the event handlers is configured to trigger reordering of a respective tagged element in the hierarchical order tree based on detection of a hover gesture.

In a fourth example of the second aspect, at least one of the event handlers is configured to trigger reordering of a respective tagged element in the hierarchical order tree based on detection of a mouse input.

In a fifth example of the second aspect, at least one of the event handlers is configured to trigger reordering of a respective tagged element in the hierarchical order tree based on detection of a keyboard input.

In a third aspect of the first example system, the reorder logic is configured to increase a number of hierarchical logical levels in the plurality of hierarchical logical levels to accommodate reordering of at least the specified tagged element. The third aspect of the first example system may be implemented in combination with the first and/or second aspect of the first example system, though the example embodiments are not limited in this respect.

In a fourth aspect of the first example system, the customizable layout includes a plurality of hierarchical interface levels. In accordance with the fourth aspect, each portion of the content is identified by a respective interface tag that indicates an order of the respective portion with respect to other portions in each hierarchical interface level in which the respective portion is included. In further accordance with the fourth aspect, the first example system further comprises mapping logic configured to map locations of the respective tagged elements in the hierarchical order tree to locations of the respective portions of the content that are represented by the respective tagged elements in the customizable layout based at least in part on the respective interface tags. The fourth aspect of the first example system may be implemented in combination with the first, second, and/or third aspect of the first example system, though the example embodiments are not limited in this respect.

In fifth aspect of the first example system, the tree creation logic is configured to create the hierarchical tree structure based at least in part on a web page being loaded. In accordance with the fifth aspect, the hierarchical elements represent respective portions of content of the web page. In further accordance with the fifth aspect, the reorder logic is configured to reorder at least the specified tagged element to cause the portion of the content that is represented by the specified tagged element to be reordered in the web page. The fifth aspect of the first example system may be implemented in combination with the first, second, third, and/or fourth aspect of the first example system, though the example embodiments are not limited in this respect.

A second example system to control a customizable layout comprises a system element comprising at least one of (a) one or more processors, (b) hardware logic, or (c) electrical circuitry. Traversal logic is configured to traverse a hierarchical tree structure that has hierarchical elements representing respective portions of content of a customizable layout that is to be displayed via a graphical user interface to identify reorderable elements among the hierarchical elements. Each reorderable element is capable of being reordered in the hierarchical tree structure. Each reorderable element has a respective interface tag indicating a hierarchical interface level of a plurality of hierarchical interface levels of the custom layout to which the portion of the content that is represented by the respective reorderable element is assigned. Tree creation logic is configured to create a hierarchical order tree to include a first subset of the reorderable elements and not a second subset of the reorderable elements based at least in part on the interface tag of each reorderable element in the first subset not indicating that the portion of the content that is represented by the respective reorderable element is assigned to a designated hierarchical interface level of the plurality of hierarchical interface levels and further based at least in part on the interface tag of each reorderable element in the second subset indicating that the portion of the content that is represented by the respective reorderable element is assigned to the designated hierarchical interface level of the plurality of hierarchical interface levels. Reorder logic, implemented using the system element, is configured to reorder at least a specified reorderable element from an initial location in the hierarchical order tree to a target location in the hierarchical order tree to cause the portion of the content that is represented by the specified reorderable element to be reordered in the customizable layout.

In a first aspect of the second example system, the first subset of the reorderable elements includes a first plurality of reorderable elements and a second plurality of reorderable elements. The first plurality of reorderable elements having a first plurality of respective reorder tags that share a first common value indicating that the first plurality of reorderable elements is to be included in a first hierarchical order tree. The second plurality of reorderable elements having a second plurality of respective reorder tags that share a second common value indicating that the second plurality of reorderable elements is to be included in a second hierarchical order tree. The second common value is different from the first common value. In accordance with the first aspect, the tree creation logic is configured to create the hierarchical order tree by creating the first hierarchical order tree to include the first plurality of reorderable elements and by creating the second hierarchical order tree to include the second plurality of reorderable elements. In further accordance with the first aspect, the first plurality of reorderable elements includes the specified reorderable element. In further accordance with the first aspect, the reorder logic is configured to move the specified reorderable element from the first hierarchical order tree to the second hierarchical order tree. In further accordance with the first aspect, the reorder logic is configured to update the reorder tag of the specified reorderable element to include the second common value.

In a second aspect of the second example system, the tree creation logic is configured to create event handlers for the respective reorderable elements in the first subset. In accordance with the second aspect, the event handlers are configured to trigger reordering of the respective reorderable elements in the hierarchical order tree. The second aspect of the second example system may be implemented in combination with the first aspect of the second example system, though the example embodiments are not limited in this respect.

In a first example of the second aspect, the first subset of the reorderable elements includes a first plurality of reorderable elements and a second plurality of reorderable elements. The first plurality of reorderable elements has a first plurality of respective reorder tags that share a first common value indicating that the first plurality of reorderable elements is to be included in a first hierarchical order tree. The second plurality of reorderable elements has a second plurality of respective reorder tags that share a second common value indicating that the second plurality of reorderable elements is to be included in a second hierarchical order tree. The second common value is different from the first common value. In accordance with the first example, the tree creation logic is configured to create the hierarchical order tree by creating the first hierarchical order tree to include the first plurality of reorderable elements and by creating the second hierarchical order tree to include the second plurality of reorderable elements. In further accordance with the first example, the first hierarchical order tree and the second hierarchical order tree share a common reorderable element. In further accordance with the first example, the handler creation logic is configured to create a first event handler associated with the first hierarchical order tree for the common reorderable element. The first event handler is configured to trigger reordering of the common reorderable element in the first hierarchical order tree. In further accordance with the first example, the handler creation logic is configured to create a second event handler associated with the second hierarchical order tree for the common reorderable element. The second event handler is configured to trigger reordering of the common reorderable element in the second hierarchical order tree.

In a second example of the second aspect, at least one of the event handlers is configured to trigger reordering of a respective reorderable element in the hierarchical order tree based on detection of a touch gesture.

In a third example of the second aspect, at least one of the event handlers is configured to trigger reordering of a respective reorderable element in the hierarchical order tree based on detection of a hover gesture.

In a fourth example of the second aspect, at least one of the event handlers is configured to trigger reordering of a respective reorderable element in the hierarchical order tree based on detection of a mouse input.

In a fifth example of the second aspect, at least one of the event handlers is configured to trigger reordering of a respective reorderable element in the hierarchical order tree based on detection of a keyboard input.

In a third aspect of the second example system, the reorder logic is configured to increase a number of hierarchical logical levels in a plurality of hierarchical logical levels among which the first subset of the reorderable elements is arranged in the hierarchical order tree to accommodate reordering of at least the specified reorderable element. The third aspect of the second example system may be implemented in combination with the first and/or second aspect of the second example system, though the example embodiments are not limited in this respect.

In a fourth aspect of the second example system, the interface tag of each reorderable element further indicates an order of the portion of the content that is represented by the respective reorderable element with respect to other portions in each hierarchical interface level in which the respective portion is included. In accordance with the fourth aspect, the second example system further comprises mapping logic configured to map locations of the respective reorderable elements in the hierarchical order tree to locations of the respective portions of the content that are represented by the respective reorderable elements in the customizable layout based at least in part on the respective interface tags. The fourth aspect of the second example system may be implemented in combination with the first, second, and/or third aspect of the second example system, though the example embodiments are not limited in this respect.

In fifth aspect of the second example system, the tree creation logic is configured to create the hierarchical tree structure based at least in part on a web page being loaded. In accordance with the fifth aspect, the hierarchical elements represent respective portions of content of the web page. In further accordance with the fifth aspect, the reorder logic is configured to reorder at least the specified reorderable element to cause the portion of the content that is represented by the specified reorderable element to be reordered in the web page. The fifth aspect of the second example system may be implemented in combination with the first, second, third, and/or fourth aspect of the second example system, though the example embodiments are not limited in this respect.

An first example computer program product comprises a computer-readable storage medium having instructions recorded thereon for enabling a processor-based system to control a customizable layout. The computer program logic comprises first instructions, second instructions, and third instructions. The first instructions are for enabling the processor-based system to traverse a hierarchical tree structure that has hierarchical elements representing respective portions of content of a customizable layout that is to be displayed via a graphical user interface to identify tagged elements among the hierarchical elements. Each tagged element has a reorder tag indicating that the respective tagged element is to be included in a hierarchical order tree. The second instructions are for enabling the processor-based system to create the hierarchical order tree to include the tagged elements. Each tagged element is capable of being reordered in the hierarchical order tree. The third instructions are for enabling the processor-based system to reorder at least a specified tagged element from an initial hierarchical logical level of a plurality of hierarchical logical levels of the hierarchical order tree to a target hierarchical logical level of the plurality of hierarchical logical levels that is different from the initial hierarchical logical level to cause the portion of the content that is represented by the specified tagged element to be reordered in the customizable layout.

An second example computer program product comprises a computer-readable storage medium having instructions recorded thereon for enabling a processor-based system to control a customizable layout. The computer program logic comprises first instructions, second instructions, and third instructions. The first instructions are for enabling the processor-based system to traverse a hierarchical tree structure that has hierarchical elements representing respective portions of content of a customizable layout that is to be displayed via a graphical user interface to identify reorderable elements among the hierarchical elements. Each reorderable element is capable of being reordered in the hierarchical tree structure. Each reorderable element has a respective interface tag indicating a hierarchical interface level of a plurality of hierarchical interface levels of the custom layout to which the portion of the content that is represented by the respective reorderable element is assigned. The second instructions are for enabling the processor-based system to create a hierarchical order tree to include a first subset of the reorderable elements and not a second subset of the reorderable elements based at least in part on the interface tag of each reorderable element in the first subset not indicating that the portion of the content that is represented by the respective reorderable element is assigned to a designated hierarchical interface level of the plurality of hierarchical interface levels and further based at least in part on the interface tag of each reorderable element in the second subset indicating that the portion of the content that is represented by the respective reorderable element is assigned to the designated hierarchical interface level of the plurality of hierarchical interface levels. The third instructions are for enabling the processor-based system to reorder at least a specified reorderable element from an initial location in the hierarchical order tree to a target location in the hierarchical order tree to cause the portion of the content that is represented by the specified reorderable element to be reordered in the customizable layout.

V. Example Computer System

Figure 7:
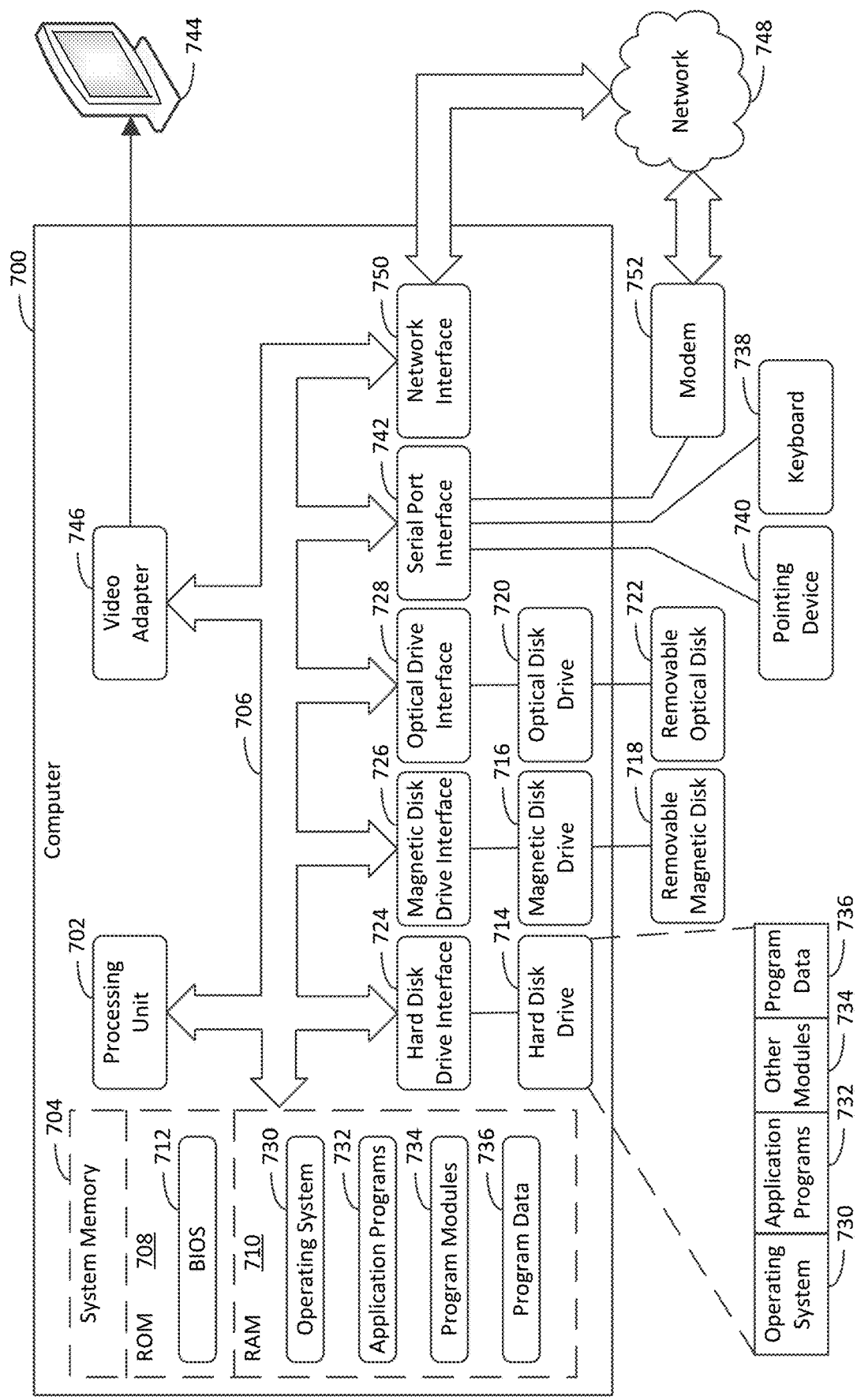
FIG. 7 depicts an example computer in which embodiments may be implemented.

FIG. 7 depicts an example computer 700 in which embodiments may be implemented. Any one or more of client devices 102A-102M, any one or more of machines 106A-106N, and/or layout reordering logic 108 shown in FIG. 1; and/or computing system 400 shown in FIG. 4 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of layout reordering logic 108, GUI 442, layout reordering logic 408, traversal logic 410, tree creation logic 412, handler creation logic 414, reorder logic 416, user interface logic 418, mapping logic 420, flowchart 200 (including any step of flowchart 200), and/or flowchart 300 (including any step of flowchart 300), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

VI. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to control a customizable layout, the system comprising:
  memory; and
  one or more processors coupled to the memory, the one or more processors configured to:
    traverse a hierarchical tree structure that has hierarchical elements representing respective portions of content of a customizable layout that is to be displayed via a graphical user interface to identify tagged elements among the hierarchical elements, each tagged element having a reorder tag indicating that the respective tagged element is to be included in a hierarchical order tree;
    create the hierarchical order tree to include the tagged elements, each tagged element indicating that the respective tagged element is capable of being reordered in the hierarchical order tree; and
    reorder at least a specified tagged element from an initial hierarchical logical level of a plurality of hierarchical logical levels of the hierarchical order tree to a target hierarchical logical level of the plurality of hierarchical logical levels that is different from the initial hierarchical logical level to cause the portion of the content that is represented by the specified tagged element to be reordered in the customizable layout.

2. The system of claim 1, wherein the tagged elements include first tagged elements and second tagged elements, the first tagged elements having respective first reorder tags that share a first common value indicating that the first tagged elements are to be included in a first hierarchical order tree, the second tagged elements having respective second reorder tags that share a second common value indicating that the second tagged elements are to be included in a second hierarchical order tree, the second common value is different from the first common value; and
  wherein the one or more processors are configured to:
    create the hierarchical order tree by creating the first hierarchical order tree to include the first tagged elements and by creating the second hierarchical order tree to include the second tagged elements, the first tagged elements including the specified tagged element;

move the specified tagged element from the first hierarchical order tree to the second hierarchical order tree; and update the reorder tag of the specified tagged element to include the second common value.

3. The system of claim 1, wherein the one or more processors are configured to create event handlers for the respective tagged elements; and wherein the event handlers are configured to trigger reordering of the respective tagged elements in the hierarchical order tree.

4. The system of claim 3, wherein the tagged elements include first tagged elements and second tagged elements, the first tagged elements having respective first reorder tags that share a first common value indicating that the first tagged elements are to be included in a first hierarchical order tree, the second tagged elements having respective second reorder tags that share a second common value indicating that the second tagged elements are to be included in a second hierarchical order tree, the second common value is different from the first common value; and wherein the one or more processors are configured to:
create the hierarchical order tree by creating the first hierarchical order tree to include the first tagged elements and by creating the second hierarchical order tree to include the second tagged elements, wherein the first hierarchical order tree and the second hierarchical order tree share a common tagged element;

create a first event handler associated with the first hierarchical order tree for the common tagged element, the first event handler configured to trigger reordering of the common tagged element in the first hierarchical order tree; and create a second event handler associated with the second hierarchical order tree for the common tagged element, the second event handler configured to trigger reordering of the common tagged element in the second hierarchical order tree.

5. The system of claim 3, wherein at least one of the event handlers is configured to trigger reordering of a respective tagged element in the hierarchical order tree based on detection of at least one of a touch gesture, a hover gesture, a mouse input, or a keyboard input.

6. The system of claim 1, wherein the one or more processors are configured to increase a number of hierarchical logical levels in the plurality of hierarchical logical levels to accommodate reordering of at least the specified tagged element.

7. The system of claim 1, wherein the customizable layout includes a plurality of hierarchical interface levels;

wherein each portion of the content is identified by a respective interface tag that indicates an order of the respective portion with respect to other portions in each hierarchical interface level in which the respective portion is included; and wherein the one or more processors are configured to map locations of the respective tagged elements in the hierarchical order tree to locations of the respective portions of the content that are represented by the respective tagged elements in the customizable layout based at least in part on the respective interface tags.

8. The system of claim 1, wherein the one or more processors are configured to:

create the hierarchical tree structure based at least in part on a web page being loaded, the hierarchical elements representing respective portions of content of the web page; and reorder at least the specified tagged element to cause the portion of the content that is represented by the specified tagged element to be reordered in the web page.

9. A system to control a customizable layout, the system comprising:

memory; and one or more processors coupled to the memory, the one or more processors configured to:

traverse a hierarchical tree structure that has hierarchical elements representing respective portions of content of a customizable layout that is to be displayed via a graphical user interface to identify reorderable elements among the hierarchical elements, each reorderable element capable of being reordered in the hierarchical tree structure, each reorderable element having a respective interface tag indicating a hierarchical interface level of a plurality of hierarchical interface levels of the customizable layout to which the portion of the content that is represented by the respective reorderable element is assigned;

create a hierarchical order tree to include a first subset of the reorderable elements and not a second subset of the reorderable elements based at least in part on the interface tag of each reorderable element in the first subset not indicating that the portion of the content that is represented by the respective reorderable element is assigned to a designated hierarchical interface level of the plurality of hierarchical interface levels and further based at least in part on the interface tag of each reorderable element in the second subset indicating that the portion of the content that is represented by the respective reorderable element is assigned to the designated hierarchical interface level; and reorder at least a specified reorderable element from an initial location in the hierarchical order tree to a target location in the hierarchical order tree to cause the portion of the content that is represented by the specified reorderable element to be reordered in the customizable layout.

10. The system of claim 9, wherein the first subset of the reorderable elements includes a first plurality of reorderable elements and a second plurality of reorderable elements, the first plurality of reorderable elements having a first plurality of respective reorder tags that share a first common value indicating that the first plurality of reorderable elements is to be included in a first hierarchical order tree, the second plurality of reorderable elements having a second plurality of respective reorder tags that share a second common value indicating that the second plurality of reorderable elements is to be included in a second hierarchical order tree, the second common value is different from the first common value; and wherein the one or more processors are configured to:
create the hierarchical order tree by creating the first hierarchical order tree to include the first plurality of reorderable elements and by creating the second hierarchical order tree to include the second plurality of reorderable elements, the first plurality of reorderable elements including the specified reorderable element;

move the specified reorderable element from the first hierarchical order tree to the second hierarchical order tree; and update the reorder tag of the specified reorderable element to include the second common value.

11. The system of claim 9, wherein the one or more processors are configured to create event handlers for the respective reorderable elements in the first subset; and wherein the event handlers are configured to trigger reordering of the respective reorderable elements in the hierarchical order tree.

12. The system of claim 11, wherein the first subset of the reorderable elements includes a first plurality of reorderable elements and a second plurality of reorderable elements, the first plurality of reorderable elements having a first plurality of respective reorder tags that share a first common value indicating that the first plurality of reorderable elements is to be included in a first hierarchical order tree, the second plurality of reorderable elements having a second plurality of respective reorder tags that share a second common value indicating that the second plurality of reorderable elements is to be included in a second hierarchical order tree, the second common value is different from the first common value; and wherein the one or more processors are configured to:
create the hierarchical order tree by creating the first hierarchical order tree to include the first plurality of reorderable elements and by creating the second hierarchical order tree to include the second plurality of reorderable elements, wherein the first hierarchical order tree and the second hierarchical order tree share a common reorderable element;

create a first event handler associated with the first hierarchical order tree for the common reorderable element, the first event handler configured to trigger reordering of the common reorderable element in the first hierarchical order tree; and create a second event handler associated with the second hierarchical order tree for the common reorderable element, the second event handler configured to trigger reordering of the common reorderable element in the second hierarchical order tree.

13. The system of claim 11, wherein at least one of the event handlers is configured to trigger reordering of a respective reorderable element in the hierarchical order tree based on detection of at least one of a touch gesture, a hover gesture, a mouse input, or a keyboard input.

14. The system of claim 9, wherein the one or more processors are configured to increase a number of hierarchical logical levels in a plurality of hierarchical logical levels among which the first subset of the reorderable elements is arranged in the hierarchical order tree to accommodate reordering of at least the specified reorderable element.

15. The system of claim 9, wherein the interface tag of each reorderable element further indicates an order of the portion of the content that is represented by the respective reorderable element with respect to other portions in each hierarchical interface level in which the respective portion is included; and wherein the one or more processors are configured to map locations of the respective reorderable elements in the hierarchical order tree to locations of the respective portions of the content that are represented by the respective reorderable elements in the customizable layout based at least in part on the respective interface tags.

16. The system of claim 9, wherein the one or more processors are configured to:
create the hierarchical tree structure based at least in part on a web page being loaded, the hierarchical elements representing respective portions of content of the web page; and reorder at least the specified reorderable element to cause the portion of the content that is represented by the specified reorderable element to be reordered in the web page.

17. A method of controlling a customizable layout using at least one of (a) one or more processors, (b) hardware logic, or (c) electrical circuitry, the method comprising:
traversing a hierarchical tree structure that has hierarchical elements representing respective portions of content of a customizable layout that is to be displayed via a graphical user interface to identify tagged elements among the hierarchical elements, each tagged element having a reorder tag indicating that the respective tagged element is to be included in a hierarchical order tree;

creating the hierarchical order tree to include the tagged elements, each tagged element indicating that the respective tagged element is capable of being reordered in the hierarchical order tree; and reordering at least a specified tagged element from an initial hierarchical logical level of a plurality of hierarchical logical levels of the hierarchical order tree to a target hierarchical logical level of the plurality of hierarchical logical levels that is different from the initial hierarchical logical level, the reordering causing the portion of the content that is represented by the specified tagged element to be reordered in the customizable layout.

18. The method of claim 17, wherein the tagged elements include first tagged elements and second tagged elements, the first tagged elements having respective first reorder tags that share a first common value indicating that the first tagged elements are to be included in a first hierarchical order tree, the second tagged elements having respective second reorder tags that share a second common value indicating that the second tagged elements are to be included in a second hierarchical order tree, the second common value is different from the first common value;

wherein creating the hierarchical order tree comprises:
creating the first hierarchical order tree to include the first tagged elements, and
creating the second hierarchical order tree to include the second tagged elements;

wherein the first tagged elements include the specified tagged element; and wherein reordering at least the specified tagged element comprises:
moving the specified tagged element from the first hierarchical order tree to the second hierarchical order tree; and
updating the reorder tag of the specified tagged element to include the second common value.

19. The method of claim 17, further comprising:
creating event handlers for the respective tagged elements, the event handlers configured to trigger reordering of the respective tagged elements in the hierarchical order tree;

wherein the tagged elements include first tagged elements and second tagged elements, the first tagged elements having respective first reorder tags that share a first common value indicating that the first tagged elements are to be included in a first hierarchical order tree, the second tagged elements having respective second reorder tags that share a second common value indicating that the second tagged elements are to be included in a second hierarchical order tree, the second common value is different from the first common value;

wherein creating the hierarchical order tree comprises:
creating the first hierarchical order tree to include the first tagged elements; and
creating the second hierarchical order tree to include the second tagged elements;

wherein the first hierarchical order tree and the second hierarchical order tree share a common tagged element; and wherein creating the event handlers comprises:
creating a first event handler associated with the first hierarchical order tree for the common tagged element, the first event handler configured to trigger reordering of the common tagged element in the first hierarchical order tree; and
creating a second event handler associated with the second hierarchical order tree for the common tagged element, the second event handler configured to trigger reordering of the common tagged element in the second hierarchical order tree.

20. The method of claim 17, wherein the customizable layout includes a plurality of hierarchical interface levels;
wherein each portion of the content is identified by a respective interface tag that indicates an order of the respective portion with respect to other portions in each hierarchical interface level in which the respective portion is included; and
wherein the method further comprises:
mapping locations of the respective tagged elements in the hierarchical order tree to locations of the respective portions of the content that are represented by the respective tagged elements in the customizable layout based at least in part on the respective interface tags.

* * * * *